(12) United States Patent
Yamaguchi

(10) Patent No.: US 9,319,539 B2
(45) Date of Patent: Apr. 19, 2016

(54) IMAGE PROCESSING APPARATUS, METHOD OF CONTROLLING IMAGE PROCESSING APPARATUS, AND NON-TRANSITORY RECORDING MEDIUM

(71) Applicant: Tomohiro Yamaguchi, Shinshiro (JP)

(72) Inventor: Tomohiro Yamaguchi, Shinshiro (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/790,051

(22) Filed: Mar. 8, 2013

(65) Prior Publication Data

US 2013/0235408 A1 Sep. 12, 2013

(30) Foreign Application Priority Data

Mar. 12, 2012 (JP) .................................. 2012-054444
Feb. 26, 2013 (JP) .................................. 2013-035815

(51) Int. Cl.
G06F 3/12 (2006.01)
G06K 15/00 (2006.01)
H04N 1/00 (2006.01)
G06T 11/60 (2006.01)

(52) U.S. Cl.
CPC .............. *H04N 1/0035* (2013.01); *G06T 11/60* (2013.01); *H04N 1/0044* (2013.01); *H04N 1/00411* (2013.01); *H04N 1/00466* (2013.01); *H04N 1/00482* (2013.01); *H04N 2201/0091* (2013.01)

(58) Field of Classification Search
None
See application file for complete search history.

(56) References Cited

U.S. PATENT DOCUMENTS

| 5,568,270 | A  | * | 10/1996 | Endo ............................. 358/475 |
| 2002/0154140 | A1 | * | 10/2002 | Tazaki .......................... 345/620 |
| 2004/0107854 | A1 | * | 6/2004  | Nakatani et al. ............. 101/484 |
| 2005/0243371 | A1 |   | 11/2005 | Kanaya et al. |
| 2007/0157084 | A1 | * | 7/2007  | Yano et al. ..................... 715/527 |
| 2007/0216973 | A1 | * | 9/2007  | Tagawa ......................... 358/527 |
| 2008/0079972 | A1 | * | 4/2008  | Goodwin et al. ........... 358/1.12 |
| 2008/0231914 | A1 | * | 9/2008  | Motoyoshi .................... 358/474 |
| 2010/0162106 | A1 | * | 6/2010  | Ikazaki et al. ................ 715/274 |

(Continued)

FOREIGN PATENT DOCUMENTS

| JP | 2004351872 A | * | 12/2004 | ............... B41J 29/42 |
| JP | 2007-306236 A |   | 11/2007 | |

(Continued)

OTHER PUBLICATIONS

Translation of JP 2004351872 A: Printing Device, Display Method Thereof, Program and Storage Medium, Miyasaka, Dec. 16, 2004.*

*Primary Examiner* — Marivelisse Santiago Cordero
*Assistant Examiner* — Moustapha Diaby
(74) *Attorney, Agent, or Firm* — Buchanan Ingersoll & Rooney PC

(57) ABSTRACT

An image processing apparatus includes a display; a document image accepting unit for accepting input of a document image obtained by a scanner; a display control unit for causing a preview image of the document image accepted by the document image accepting unit to be displayed on the display while being moved in a prescribed direction in a sequential manner; an operation accepting unit for accepting an operation of image editing for document images, which are series of document images accepted by the document image accepting unit, including the document image corresponding to the preview image moving on the display; and an editing unit for performing the image editing accepted by the operation accepting unit for the document images.

22 Claims, 27 Drawing Sheets

(56) References Cited

U.S. PATENT DOCUMENTS

| | | | |
|---|---|---|---|
| 2010/0177348 A1* | 7/2010 | Yamada | 358/1.15 |
| 2011/0122441 A1* | 5/2011 | Shiohara | 358/1.15 |
| 2011/0279360 A1* | 11/2011 | Kimura et al. | 345/156 |
| 2012/0013928 A1* | 1/2012 | Yoshida et al. | 358/1.13 |
| 2012/0050807 A1* | 3/2012 | Noda et al. | 358/1.15 |
| 2012/0069393 A1* | 3/2012 | Shoji et al. | 358/1.15 |
| 2012/0131452 A1* | 5/2012 | Ogino et al. | 715/274 |

FOREIGN PATENT DOCUMENTS

| | | |
|---|---|---|
| JP | 2010-003316 A | 1/2010 |
| JP | 2010-226466 A | 10/2010 |

* cited by examiner

WHEN HAND OR FINGER IS MOVED IN
DIRECTION FROM WHICH IMAGE IS SCROLLED,
RESUME SCROLLING PREVIEW IMAGE IN DIRECTION
FROM WHICH PREVIEW IMAGE IS SCROLLED

STOP IMAGE INPUT

STOP IMAGE INPUT WHEN HAND
OR FINGER IS PLACED ON SIDE
FROM WHICH IMAGE IS SCROLLED
(RIGHT SIDE IN FIGURE)

FIG.11
(A) 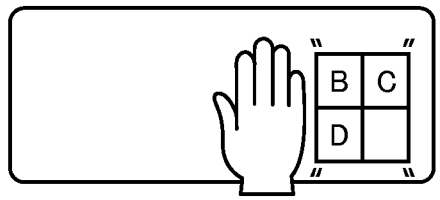
WHEN HAND OR FINGER IS PLACED ON SIDE FROM WHICH PREVIEW IMAGE IS SCROLLED (RIGHT SIDE IN FIGURE), PREVIEW IMAGE FOR DOUBLE-SIDED PRINTING (BACK SURFACE) IS EDITED
MOVE HAND AWAY FROM PREVIEW IMAGE AND OUTPUT
(B) 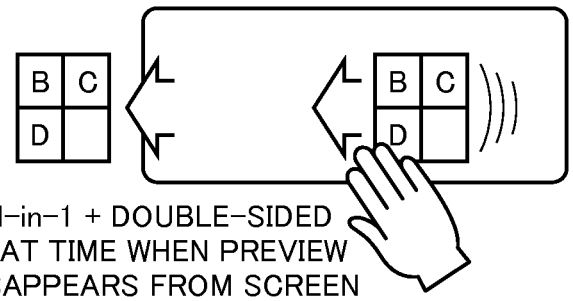
OUTPUT N-in-1 + DOUBLE-SIDED PRINTING AT TIME WHEN PREVIEW IMAGE DISAPPEARS FROM SCREEN

FIG.12

READ DOCUMENT B BY SCANNER

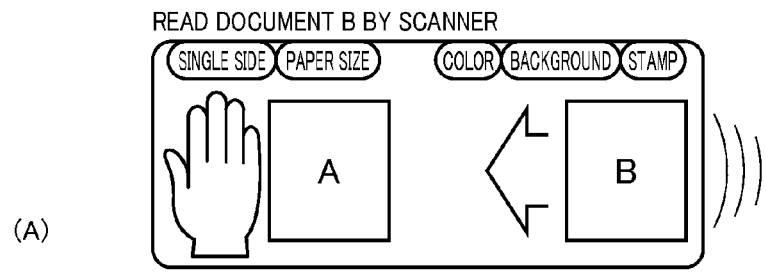

(A)

EDITING FUNCTION PER OUTPUT PAPER UNIT
ON LEFT SIDE OF PANEL (REGION SD1)

EDITING FUNCTION PER INPUT IMAGE UNIT
ON RIGHT SIDE OF PANEL (REGION SD2)

USER TOUCHES PANEL

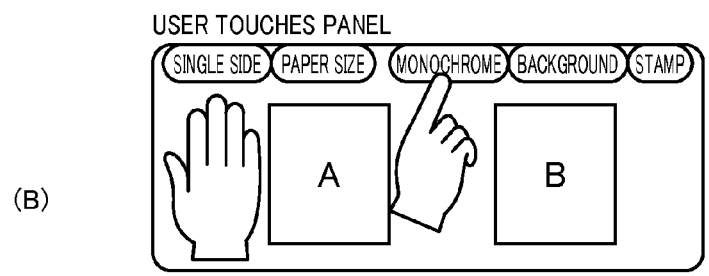

(B)

SELECT MENU IN UPPER PORTION OF SCREEN

PAPER SIZE, DOUBLE-SIDED PRINTING, DOCUMENT MODE,
STAMP AND THE LIKE CAN BE SELECTED

EDIT INPUT IMAGE

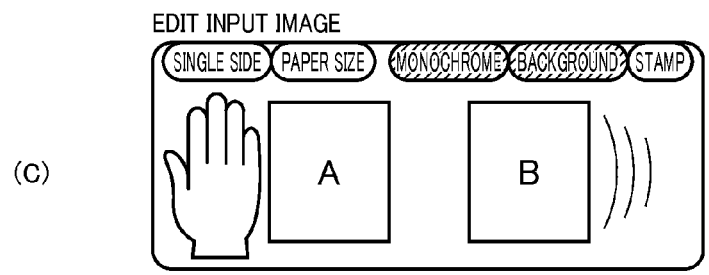

(C)

SELECT MENU IN UPPER PORTION OF SCREEN

EXAMPLE. MONOCHROME + BACKGROUND REMOVAL

END EDITING OF INPUT IMAGE

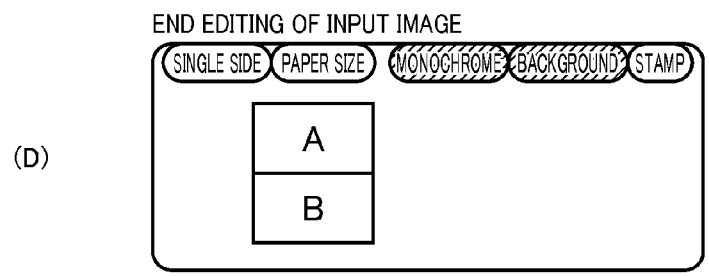

(D)

COLOR DOCUMENT AND MONOCHROME DOCUMENT
COMBINED INTO N-in-1 LAYOUT

FIG.13
(A) READ FIRST PAGE OF DOCUMENT BY SCANNER
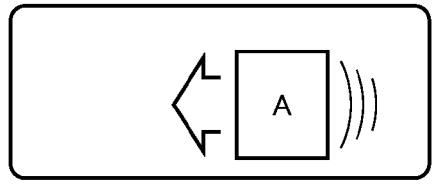
(B) TOUCH STAPLE POSITION
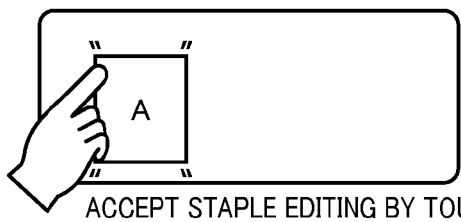
ACCEPT STAPLE EDITING BY TOUCHING STAPLE POSITION (UPPER LEFT)
(C) DESIGNATE DOCUMENT TO BE STAPLED
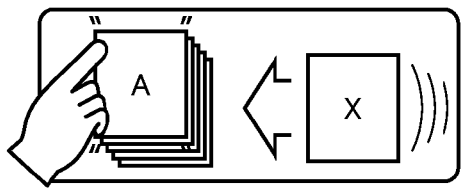
(D) START STAPLING
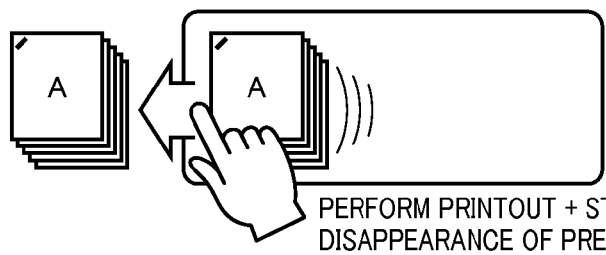
PERFORM PRINTOUT + STAPLING UPON DISAPPEARANCE OF PREVIEW IMAGE FROM SCREEN
(E) TOUCH STAPLE POSITION
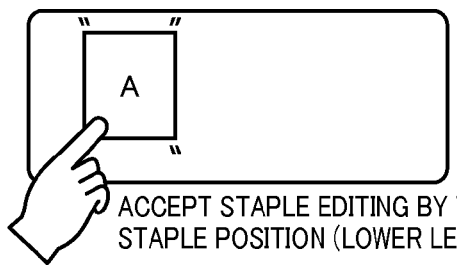
ACCEPT STAPLE EDITING BY TOUCHING STAPLE POSITION (LOWER LEFT)

IMAGE PROCESSING APPARATUS, METHOD OF CONTROLLING IMAGE PROCESSING APPARATUS, AND NON-TRANSITORY RECORDING MEDIUM

This application is based on Japanese Patent Application Nos. 2012-054444 and 2013-035815 filed with the Japan Patent Office on Mar. 12, 2012 and Feb. 26, 2013, the entire content of which is hereby incorporated by reference.

BACKGROUND OF THE INVENTION

1. Field of the Invention

The present invention relates to an image processing apparatus equipped with an operation panel, and relates to a manner of an operation for performing a specific function.

2. Description of the Related Art

In recent years, a multifunctional image processing apparatus such as an MFP (Multi Function Peripheral) has been widely spread. This MFP is an image processing apparatus that has a BOX function integrally including a copy, network printing, a scanner, a facsimile, a document server or the like, and is also referred to as a multifunctional complex machine.

According to the image processing apparatus, generally, in the case where editing of a large number of images is performed as one job, for example, when combination editing (N-in-1, that is, N (more than one) pages in one sheet), double-sided printing or the like is selected, editing condition of the job cannot be changed.

Accordingly, in order to obtain an intended output image, such a procedure is employed that a document is divided in advance, and then, the editing details are changed for each of the divided documents. The more the number of dividing the document is increased and the more the editing details are complicated, the more the time and effort required for preliminary preparation is increased, which causes a problem of decreased convenience for the user.

In this point, for example, Japanese Laid-Open Patent Publication No. 2010-003316 or 2007-306236 discloses a configuration in which all images are read once, and these images are displayed on a panel and designated, thereby performing image editing. Also, Japanese Laid-Open Patent Publication No. 2010-226466 discloses a configuration in which an image is rotated, duplicated and scaled by touching and tracing a thumbnail image on the panel.

In the above literatures, complicated operations should be performed, for example, editing work cannot be performed until reading of all images are completed, or the panel should be touched and traced for image editing.

SUMMARY OF THE INVENTION

According to one embodiment, the present invention aims to provide an image processing apparatus allowing a setting for image editing to be made in a simple operation, a method of controlling the image processing apparatus, and a control program.

An image processing apparatus according to an aspect includes a display; a document image accepting unit for accepting input of a document image obtained by a scanner; a display control unit for causing a preview image of the document image accepted by the document image accepting unit to be displayed on the display while being moved in a prescribed direction in a sequential manner; an operation accepting unit for accepting an operation of image editing for document images, which are series of document images accepted by the document image accepting unit, including the document image corresponding to the preview image moving on the display; and an editing unit for performing the image editing accepted by the operation accepting unit for the document images.

Preferably, when a user performs an operation of stopping movement of the preview image on the display, the operation accepting unit is configured to: determine the operation as being for stopping movement of the preview image; and accept stop of movement of the preview image.

Particularly, when detecting a user operation of interrupting movement of the preview image in the prescribed direction on the display, the operation accepting unit is configured to determine the user operation as being for stopping movement of the preview image.

Particularly, when detecting a user operation of pressing the preview image moving on the display, the operation accepting unit is configured to determine the user operation as being for stopping movement of the preview image.

Particularly, the operation accepting unit further includes a position determination unit for determining a position of the preview image stopped on the display. The editing unit is configured to change details of image editing based on a determination result of the position determination unit.

Particularly, the image editing is image editing for page combination. The editing unit is configured to switch a front surface and a back surface of a recording paper sheet to be subjected to image editing for page combination.

Particularly, when the operation accepting unit accepts stop of movement of the preview image, the display control unit is configured to cause said display to display a corresponding preview image in a stopped state, and when a subsequent preview image moving in the prescribed direction overlaps with the stopped preview image, the operation accepting unit is configured to accept image editing for combining document images corresponding to overlapping preview images.

Particularly, when the operation accepting unit accepts image editing for combining the document images corresponding to the overlapping preview images, the display control unit is configured to cause a preview image obtained by combining the document images to be displayed.

Particularly, when the number of preview images in the document images subjected to page combination exceeds a prescribed number, the editing unit is configured to: perform image editing for combining the prescribed number of document images among the document images corresponding to the overlapping preview images for printing on a front surface of a recording paper sheet; and perform image editing for combining remaining document images among the document images corresponding to the overlapping preview images for printing on a back surface of the recording paper sheet.

Particularly, when the user performs an operation of accepting post-processing editing for recording paper sheets corresponding to the document images and having images formed thereon, the operation accepting unit is configured to: determine the operation as being for accepting the post-processing editing for the recording paper sheets having images formed thereon; and accept the post-processing editing for the recording paper sheets having images formed thereon.

Particularly, when the user performs an operation of cancelling stopped movement of the preview image displayed on the display, the operation accepting unit is configured to: determine the operation as being for cancelling stopped movement of the preview image; accept cancellation of stopped movement of the preview image; and end acceptance of image editing for combining the document images corresponding to the overlapping preview images.

Particularly, in a case where the number of preview images in the document images subjected to page combination is an odd number when the operation accepting unit accepts cancellation of stopped movement of the preview image, the operation accepting unit is configured to end acceptance of image editing after accepting a document image corresponding to a next preview image or a blank image.

Preferably, when the operation accepting unit accepts an operation of moving the preview image in a direction opposite to the prescribed direction of the preview image in a state where the operation accepting unit has accepted image editing for the preview image moving on the display, the operation accepting unit is configured to reset the accepted image editing.

Preferably, when a user performs an operation of stopping input of the document image by the document image accepting unit, the operation accepting unit is configured to: determine the operation as being for stopping input of the document image; and accept stop of input of the document image.

Preferably, the operation accepting unit further includes a finger detection unit for detecting the number of fingers that touch the display. The operation accepting unit is configured to: determine that image processing for combining the document images in accordance with the number of fingers detected by the finger detection unit has been accepted; and accept image processing for combining the document images.

An image processing apparatus according to another aspect includes a display; a document image accepting unit for accepting input of a document image obtained by a scanner; a display control unit for causing a preview image of the document image accepted by the document image accepting unit to be displayed on the display while being moved in a prescribed direction in a sequential manner; an operation accepting unit for accepting an operation of image editing for document images, which are series of document images accepted by the document image accepting unit, including the document image corresponding to the preview image moving on the display; and an output unit for outputting, to a post-processing device, post-processing editing so as to be performed that is accepted by the operation accepting unit for recording paper sheets corresponding to the document images and having images formed thereon.

A method of controlling an image processing apparatus according to an aspect is a method of controlling an image processing apparatus including a display. The method includes: accepting input of a document image obtained by a scanner; causing a preview image of the accepted document image to be displayed on the display while being moved in a prescribed direction in a sequential manner; accepting an operation of image editing for document images, which are series of document images accepted, including the document image corresponding to the preview image moving on the display; and performing the image editing accepted for the document images.

A method of controlling an image processing apparatus according to another aspect is a method of controlling an image processing apparatus including a display. The method includes: accepting input of a document image obtained by a scanner; causing a preview image of the accepted document image to be displayed on the display while being moved in a prescribed direction in a sequential manner; accepting an operation of image editing for document images, which are series of document images accepted, including the document image corresponding to the preview image moving on the display; and outputting, to a post-processing device, post-processing editing so as to be performed that is accepted for recording paper sheets corresponding to the document images and having images formed thereon.

A non-transitory recording medium according to an aspect stores a control program of an image processing apparatus. The control program of the image processing apparatus is a control program executed by a computer of an image processing apparatus including a display. The control program causes the computer to perform a process including: accepting input of a document image obtained by a scanner; causing a preview image of the accepted document image to be displayed on the display while being moved in a prescribed direction in a sequential manner; accepting an operation of image editing for document images, which are series of document images accepted, including the document image corresponding to the preview image moving on the display; and performing the image editing accepted for the document images.

A non-transitory recording medium according to another aspect stores a control program of an image processing apparatus. The control program of the image processing apparatus is a control program executed by a computer of an image processing apparatus including a display. The control program causes the computer to perform a process including: accepting input of a document image obtained by a scanner; causing a preview image of the accepted document image to be displayed on the display while being moved in a prescribed direction in a sequential manner; accepting an operation of image editing for document images, which are series of document images accepted, including the document image corresponding to the preview image moving on the display; and outputting, to a post-processing device, post-processing editing so as to be performed that is accepted for recording paper sheets corresponding to the document images and having images formed thereon.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram illustrating a manner of an operation (fifth) on operation panel 13 according to the present embodiment.

FIG. 12 is a diagram illustrating a manner of an operation (sixth) on operation panel 13 according to the present embodiment.

FIG. 13 is a diagram illustrating a manner of an operation (seventh) on operation panel 13 according to the present embodiment.

DESCRIPTION OF THE PREFERRED EMBODIMENTS

Figure 1:
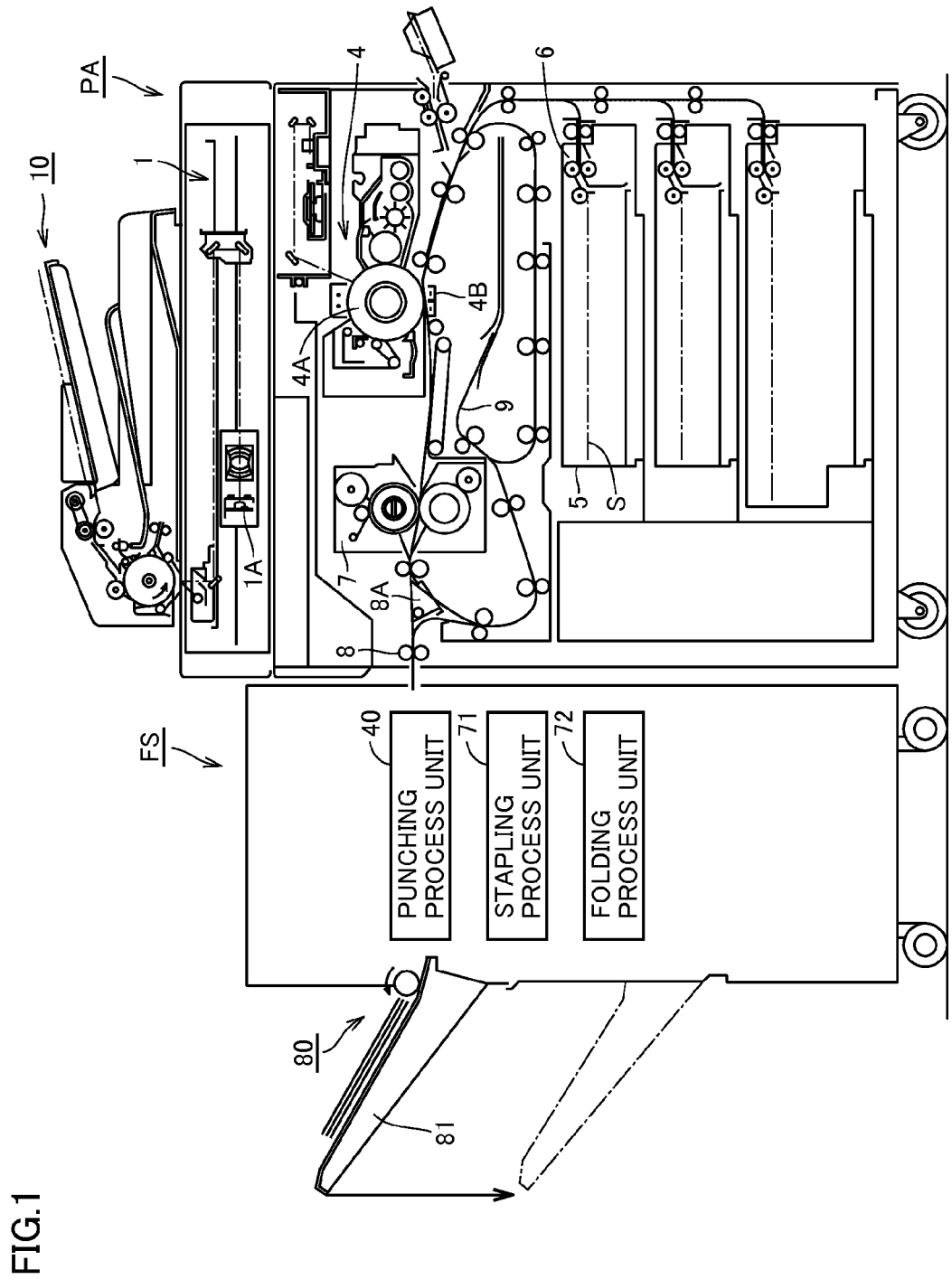
FIG. 1 is a schematic cross-sectional view of an image forming system including a post-processing device (sheet processing device) FS and an image forming apparatus PA according to the present embodiment.

The embodiments of the present embodiment will be hereinafter described with reference to the accompanying drawings. In the following description, the same parts and components are designated by the same reference characters. Names and functions thereof are also the same. Accordingly, the detailed description thereof will not be repeated.

[1. Image Forming System]

[1.1 Entire Configuration of Image Forming System]

FIG. 1 is a schematic cross-sectional view of an image forming system including a post-processing device (sheet processing device) FS and an image forming apparatus PA according to the present embodiment.

(Image Forming Apparatus PA)

Image forming apparatus PA includes an image reading unit 1, an image forming unit 4, a paper feeding cassette 5, a paper feeding roller 6, a fixing device 7, a paper discharge roller 8, and an automatic double-sided copy paper feeding unit 9.

Image forming apparatus PA is provided thereon with an auto document feeder 10. A post-processing device FS is coupled to image forming apparatus PA on its left side surface as seen in the figure and on the paper feeding roller 8 side. The document placed on the document platen of auto document feeder 10 is conveyed along a conveying path. Then, an image on one side or images on both sides of the document is or are scanned by an optical system of image reading unit 1, and read into a CCD image sensor 1A.

After an analog signal photoelectrically converted by CCD image sensor 1A is subjected to analog processing, A/D conversion, shading compensation, image compression processing and the like, the obtained image data is transmitted to an image writing unit that is not shown. In the image writing unit, a semiconductor laser light is driven to be emitted based on the image data. Specifically, semiconductor laser light is applied to a photoreceptor drum 4A of image forming unit 4 to form a latent image. In image forming unit 4, processes such as charging, exposure, development, transfer, separation, cleaning are performed to form a toner image on photoreceptor drum 4A.

A recording paper sheet S fed by paper feeding roller 6 from paper feeding cassette 5 reaches photoreceptor drum 4A. Then, the toner image is transferred by transfer means 4B onto recording paper sheet S. Recording paper sheet S having the toner image carried thereon is processed to be fixed by fixing device 7 and fed from paper discharge roller 8 to post-processing device FS. When making a double-sided copy, recording paper sheet S having one side subjected to image processing is fed by a conveying-path switching plate 8A into an automatic double-sided copy paper feeding unit 9. Then, after the toner image is transferred onto the back surface of recording paper sheet S and fixed thereon in image forming unit 4, recording paper sheet S is fed from paper discharge roller 8 into post-processing device FS.

(Post-Processing Device FS)

Post-processing device FS includes a punching process unit 40 performing a punching process, a stapling process unit 71 performing a stapling process, and a folding process unit 72 performing a folding process. Since each process is a commonly used technique, details thereof will not be explained herein.

Recording paper sheet S (also referred to as a sheet), which has an image formed thereon and fed from paper discharge roller 8 of image forming apparatus PA into post-processing device FS, is conveyed into post-processing device FS. Then, after performing post-processing designated in punching process unit 40, stapling process unit 71 and folding process unit 72 as appropriate, the post-processed recording paper sheet S is discharged from a paper discharge unit 80 to an elevate tray 81 provided at the outlet of post-processing device FS.

Elevate tray 81 moves downward as shown by a dashed line in the figure such that the topmost surface of the discharged sheet S is continuously maintained at the fixed height. Consequently, it becomes possible to stack several thousand sheets on elevate tray 81.

[1.2 Function of Image Forming Apparatus PA]

Figure 2:
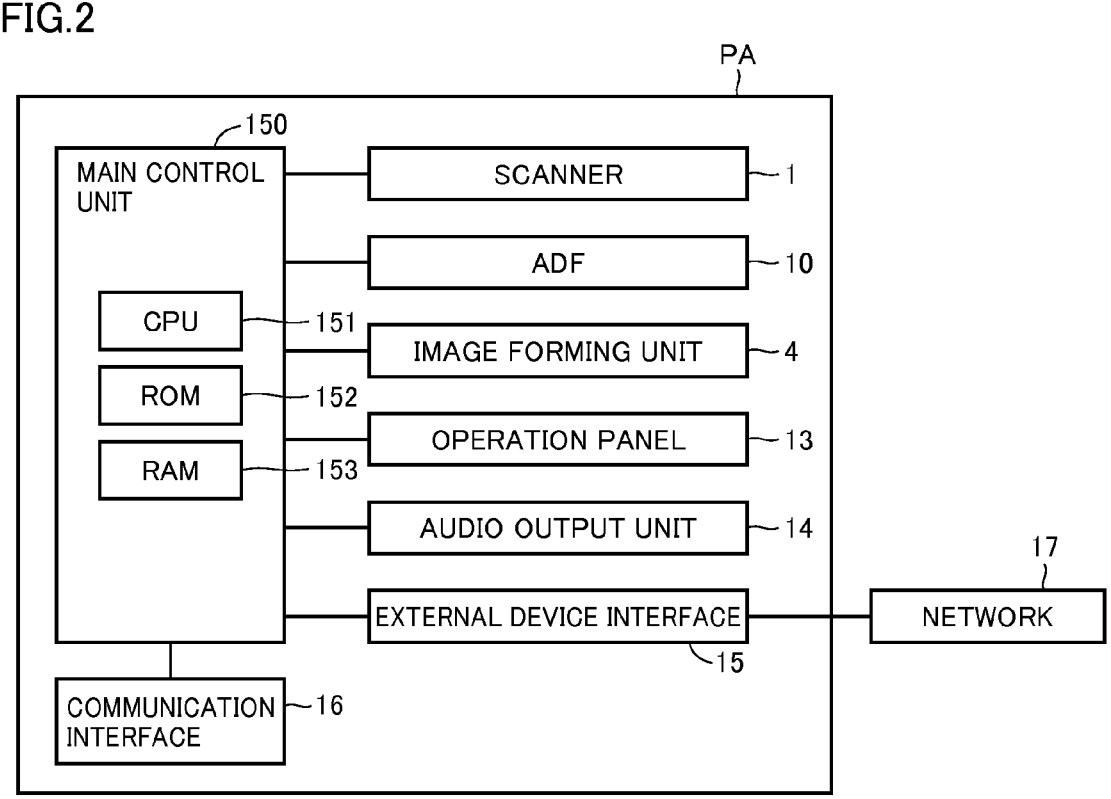
FIG. 2 is a schematic block diagram of image forming apparatus PA according to the present embodiment.

FIG. 2 is a schematic block diagram of image forming apparatus PA according to the present embodiment.

Referring to FIG. 2, image forming apparatus PA includes a main control unit 150 controlling the entire apparatus, a scanner 1, an image forming unit 4, an auto document feeder (ADF) 10, an operation panel 13, an audio output unit 14, an external device interface 15, and a communication interface 16. In addition, main control unit 150 functions also as an image processing apparatus that receives input of image data from scanner 1, performs image processing and outputs the resultant to image forming unit 4.

Main control unit 150 includes a CPU (Central Processing Unit) 151 for executing various kinds of programs including an operating system (OS), a ROM (Read Only Memory) 152 in which the program executed by CPU 151 is stored in advance, a RAM (Random Access Memory) 153 temporarily storing data required for executing a program part of CPU 151.

Main control unit 150 performs reading control for reading an image from the document placed on ADF 10 using image reading unit 1 and converting the read image into electronic data; image-processing control for performing various image processing for the read image, image forming control for forming the image-processed image on a sheet by the known electrophotographic process using an image writing unit (not shown) and image forming unit 4; and paper feeding control for conveying the sheet having an image formed thereon.

Operation panel 13 having a display unit and a touch panel is configured such that settings for types of post-processing subjected to the sheet and operation settings for other various functions can be made, and also such that confirmation of the set functions, various warnings and the like can be displayed. Operation panel 13 is provided, for example, with ten keys for setting the number of copies to be made, a start key for instructing to start an operation, a stop key for instructing to stop an operation, a reset key for initializing various setting conditions, and the like, which will be described later.

Settings for image editing, post-processing editing or the like, which will be described later, are input based on the user's operation through operation panel 13 into main control unit 150.

Main control unit 150, for example, transmits a job for executing post-processing editing to post-processing device FS through communication interface 16. Then, post-processing device FS performs post-processing editing based on the transmitted information.

Audio output unit 14 outputs an operation sound, a warning sound, and an error sound emitted when errors such as a paper jam occur. An external network 17 is connected to external device interface 15, which allows communication with other devices on the network.

In addition to a copying function, image forming apparatus PA has a scanning function of obtaining image data, a printing function of receiving image data from devices such as an external personal computer (not shown) for printing, a facsimile function allowing facsimile transmission, and the like.

[1.3 Function of Post-Processing Device FS]

Figure 3:
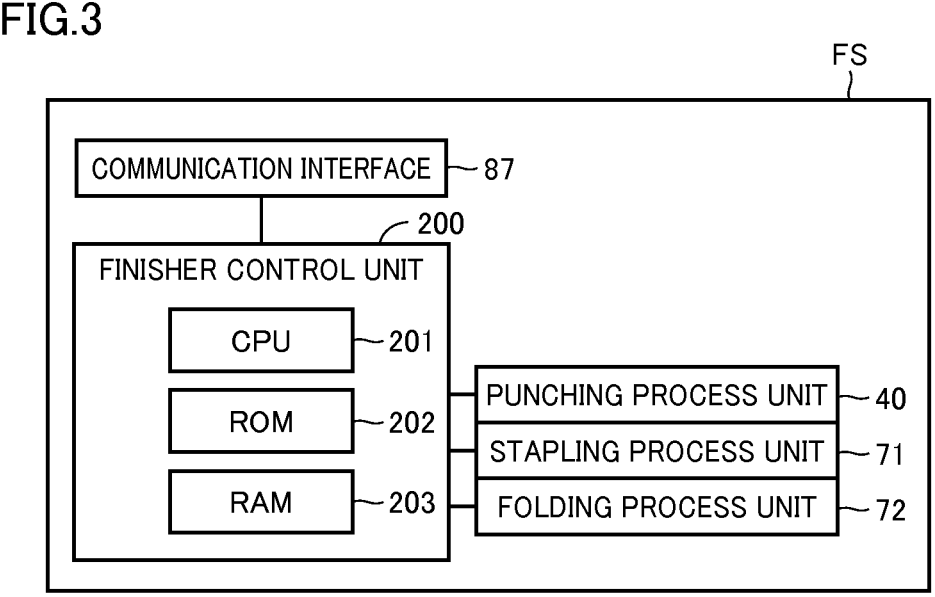
FIG. 3 is a schematic block diagram of post-processing device FS according to the present embodiment.

FIG. 3 is a schematic block diagram of post-processing device FS according to the present embodiment.

Referring to FIG. 3, post-processing device FS includes a finisher control unit 200 controlling the entire post-processing device FS, and a communication interface 87 for communicating information to and from image forming apparatus PA.

Finisher control unit 200 includes a CPU 201 for executing various programs including an operating system, a ROM 202 in which the program executed by CPU 201 is stored in advance, and a RAM 203 temporarily storing image data and data that is required for executing a program part of CPU 201. RAM 203 can store a plurality of pieces of image data.

Finisher control unit 200 controls each part in post-processing device FS based on the job of executing the post-processing editing that is output from image forming apparatus PA.

Finisher control unit 200 controls each of punching process unit 40, stapling (binding) process unit 71, and folding process unit 72, and the like.

[1.4 Configuration of Operation Panel]

Figure 4:
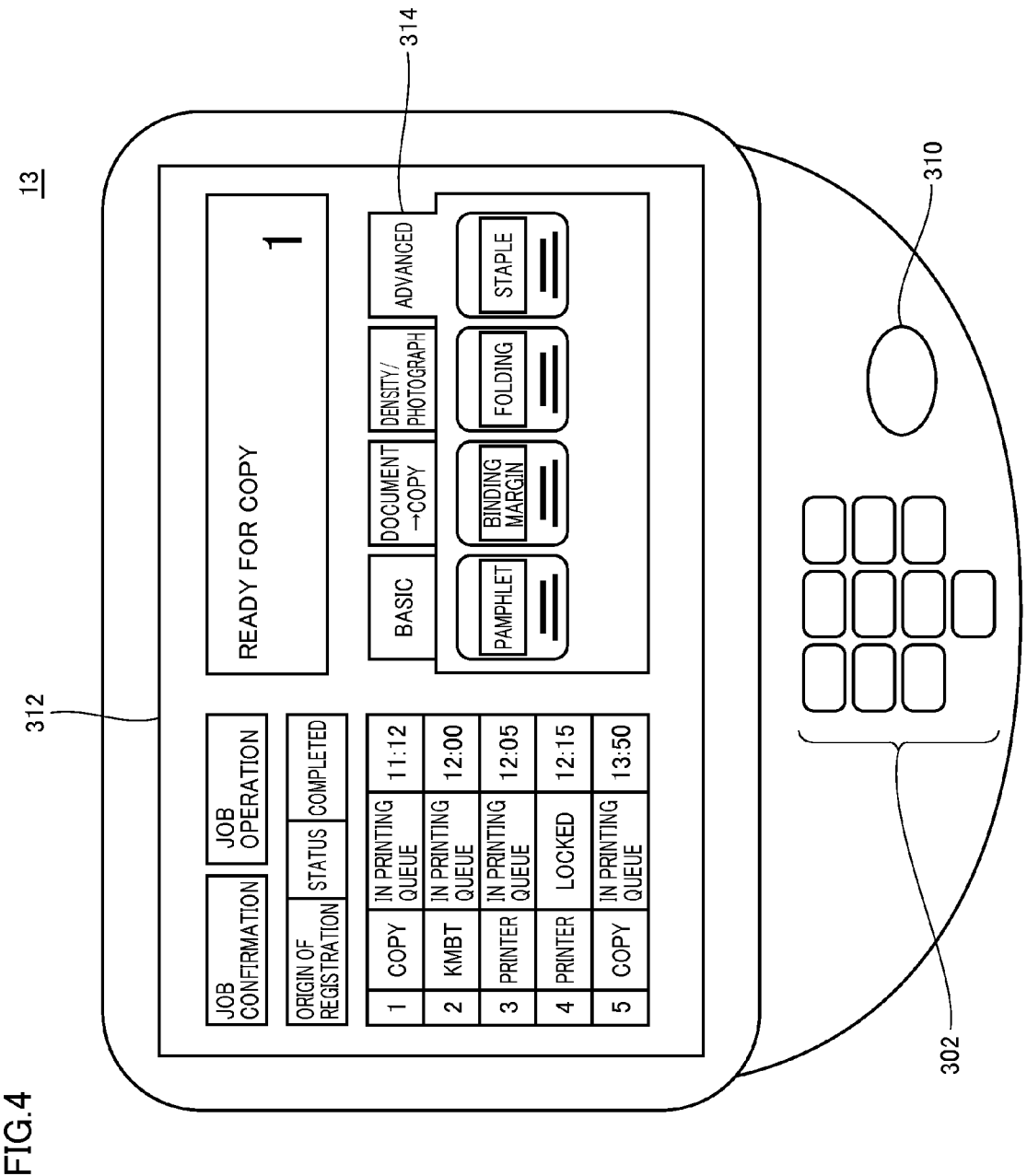
FIG. 4 is a general view of an operation panel 13 according to the present embodiment.

FIG. 4 is a general view of operation panel 13 according to the present embodiment.

Referring to FIG. 4, operation panel 13 according to the present embodiment includes a display unit (display) 312, ten keys 302, and a start button 310. Other keys are not shown.

A touch panel is provided on display unit 312, which allows a prescribed operation to be performed on display unit 312. Ten keys 302 each serve as a button for entering the number of pages to be copied or the like. Start button 310 is for instructing execution of processes such as copying/scanning.

Furthermore, display unit 312 provides display of various types of modes and others. In addition, various settings in accordance with the contents to be displayed can be made through the touch panel. For example, on display unit 312, a tab button 314 is generally disposed for basic/advanced settings that are made when performing a copying operation or a scanning operation. When each tab button is pressed, a hierarchical screen for performing corresponding detail settings is displayed.

Furthermore, when a document is read by scanning, a preview image of the read image data is displayed on operation panel 13 in the present example, by way of example, from right to left in a scrolling manner, which will be described later. Various operation instructions can be executed for this preview image displayed in a scrolling manner.

Figure 5:
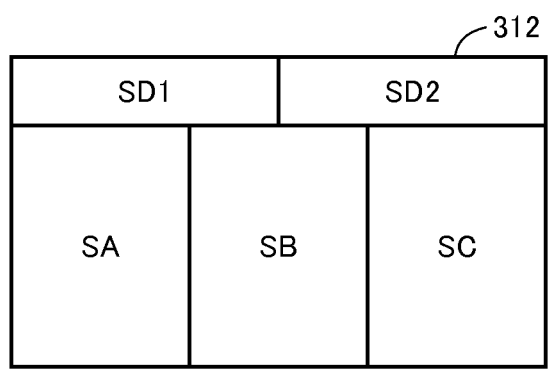
FIG. 5 is a diagram illustrating a detection region on a touch panel provided on a display unit 312 according to the present embodiment.

FIG. 5 is a diagram illustrating a detection region on a touch panel provided on display unit 312 according to the present embodiment.

Referring to FIG. 5, the figure shows the case where five regions SA, SB, SC, SD1, and SD2 are divided each as a detection region on the touch panel.

Specifically, for example, when the upper left portion of display unit 312 is touched, it is detected that an operation has been performed in region SD1. Furthermore, the upper right portion of display unit 312 is touched, it is detected that an operation has been performed in region SD2. Furthermore, when the left side portion of display unit 312 is touched, it is detected that an operation has been performed in region SA. When the center portion of display unit 312 is touched, it is detected that an operation has been performed in region SB. When the right side portion of display unit 312 is touched, it is detected that an operation has been performed in region SC.

In the present example, it is assumed that settings for image editing are allocated to their respective detection regions.

[1.5 Functional Block Diagram of Main Control Unit 150]

Figure 6:
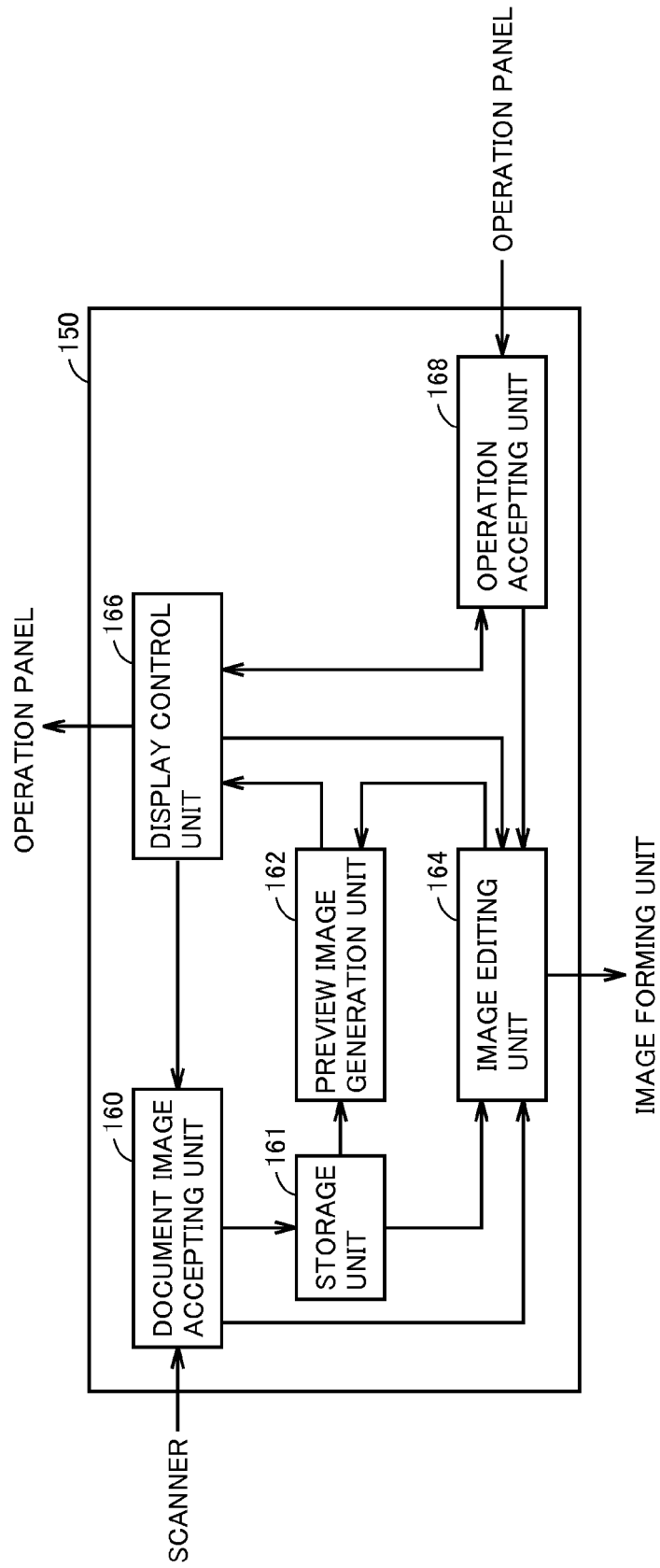
FIG. 6 is a diagram illustrating a functional block implemented in a CPU 151 of a main control unit 150 according to the present embodiment.

FIG. 6 is a diagram illustrating a functional block implemented in CPU 151 of main control unit 150 according to the present embodiment.

Referring to FIG. 6, main control unit 150 includes a document image accepting unit 160, a storage unit 161, a preview image generation unit 162, an image editing unit 164, a display control unit 166, and an operation accepting unit 168, which are implemented by CPU 151 cooperating with each unit based on the program stored in ROM 202. In addition to these, functional blocks for performing various processes are also implemented as appropriate.

Operation accepting unit 168 accepts input from operation panel 13. Specifically, operation accepting unit 168 accepts an input instruction through the touch panel on the operation panel 13. Then, operation accepting unit 168 outputs the accepted operation input instruction to display control unit 166 and image editing unit 164. Operation accepting unit 168 further accepts a setting for image editing based on the displayed state of the preview image displayed on display unit 312 on operation panel 13.

Document image accepting unit 160 accepts input of image data from scanner 1, and stores it in storage unit 161. Storage unit 161 is implemented using RAM 153.

Preview image generation unit 162 generates a preview image based on the image data stored in RAM 153. Preview image generated in preview image generation unit 162 is output to display control unit 166. In addition, since image data is stored in RAM 153, it is possible to use the image data stored in RAM 153 again to generate a preview image and display the image on display unit 312 even after the preview image displayed on display unit 312 disappears. In addition, preview image generation unit 162 generates a preview image obtained by image editing in accordance with the instruction from image editing unit 164.

Image editing unit 164 performs image editing based on the image data stored in storage unit 161 in accordance with the instructions from display control unit 166 and operation accepting unit 168, and outputs the resultant to image forming unit 4. In addition, image editing unit 164 instructs preview image generation unit 162 to generate a preview image obtained by image editing.

Display control unit 166 causes an operation screen to be displayed on display unit 312 of operation panel 13 in accordance with the instruction from operation accepting unit 168, or causes a preview image to be displayed on display unit 312 of operation panel 13. The above-described displaying manner includes a manner of displaying a preview image in a scrolled state, a manner of displaying a preview image in accordance with image editing, and the like.

[2. Description of Manner of Operation]

The relation between the manner of an operation performed on operation panel 312 and image editing will be hereinafter specifically described.

[2.1 Manner of Operation on Operation Panel (First)]

Figure 7:
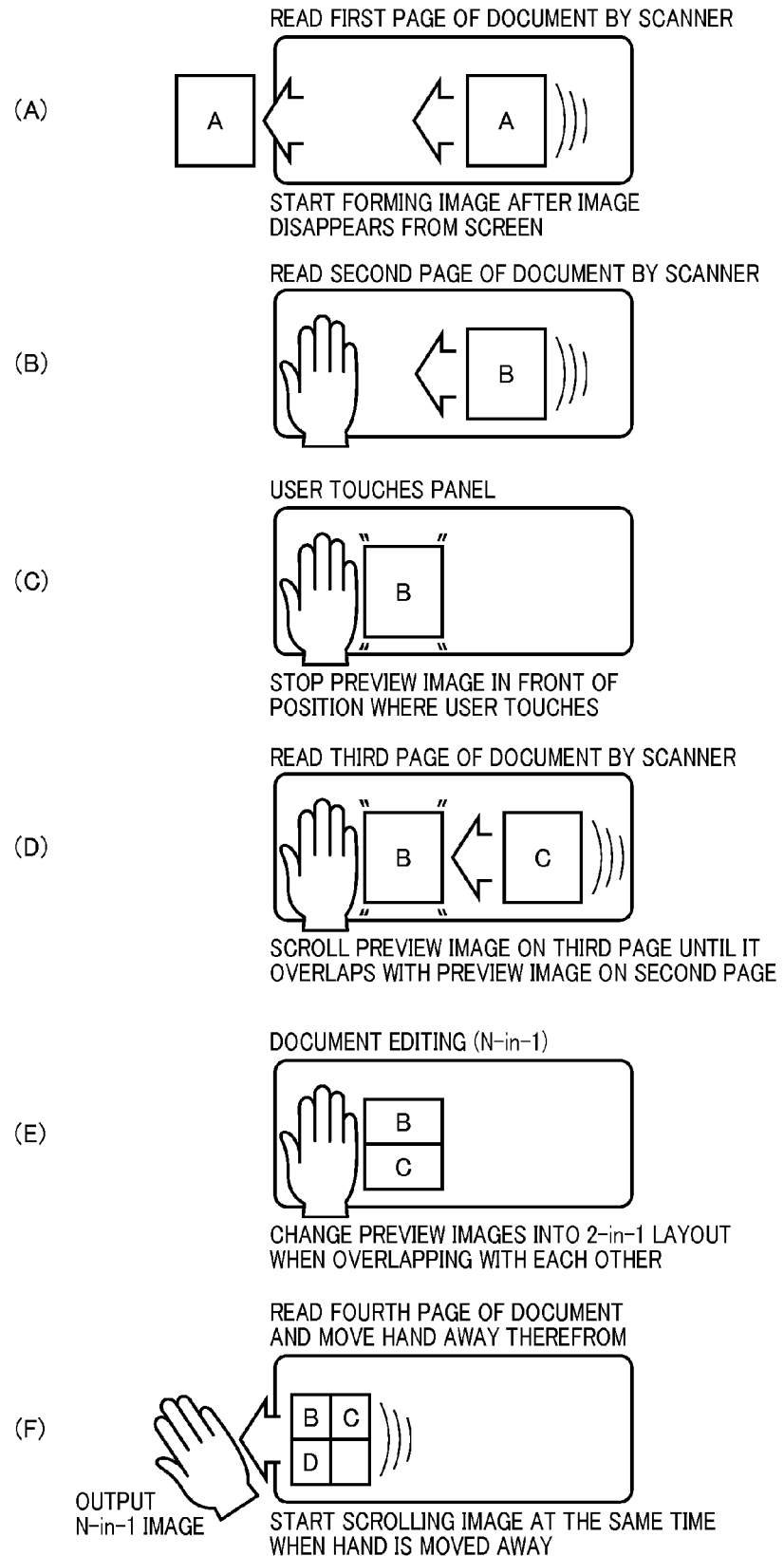
FIG. 7 is a diagram illustrating a manner of an operation (first) on operation panel 13 according to the present embodiment.

FIG. 7 is a diagram illustrating the manner of an operation (first) on operation panel 13 according to the present embodiment.

Referring to FIG. 7(A), the figure shows the case where scanner 1 reads the first page ("A") of the document. When scanner 1 reads the first page of the document, document image accepting unit 160 accepts the image data on the first page of the document. Then, preview image generation unit 162 generates a preview image of this image data, and outputs the preview image to display control unit 166. Then, display control unit 166 performs display control for the preview image (displaying in a scrolling manner). In the present example, a preview image is displayed on display unit 312 of operation panel 13, and scrolled from right to left.

By performing a prescribed operation through the touch panel on operation panel 13 for the preview image displayed in a scrolling manner, prescribed image editing can be set.

The present example shows the case where the user performs no operation on the touch panel of operation panel 13. In other words, in this case, the preview image is scrolled from right to left, and disappears from display unit 312. After the preview image disappears from display unit 312, display control unit 165 notifies image editing unit 164 that the preview image disappears from display unit 312. Then, image editing unit 164 performs a normal image editing process such as noise rejection for the image data and outputs the resultant to image forming unit 4. Then, a printing process for recording paper sheet S is performed in image forming unit 4.

Referring to FIG. 7(B), the figure shows the case where scanner 1 reads the second page ("B") of the document. When scanner 1 reads the second page of the document, document image accepting unit 160 accepts image data on the second page of the document, as described above. Then, preview image generation unit 162 generates a preview image, and outputs the preview image to display control unit 166. Then, display control unit 166 performs display control for the preview image (displaying in a scrolling manner). The present example shows the case where a preview image is displayed on display unit 312 of operation panel 13 and scrolled from right to left, in which case a user is also going to place his/her hand on region SA on the touch panel of operation panel 13 as a prescribed operation manner.

Referring to FIG. 7(C), the present example shows the case where the user places his/her hand on region SA on the touch panel of operation panel 13 in the state shown in FIG. 7(B). Specifically, in this case, contact with region SA is detected. The setting of image editing for page combination (N-in-1) is accepted by the user placing his/her hand on region SA. Specifically, operation accepting unit 168 accepts the setting of image editing for page combination, and notifies image editing unit 164 and display control unit 166 of the accepted setting. In the above-described case, display control unit 166 causes the preview image to stop in a region (for example, region SB) in front of the portion on which the user places his/her hand (the position with which the user's hand comes into contact). Specifically, by interrupting movement of the preview image, it is determined that movement of the preview image has been stopped.

Referring to FIG. 7(D), the figure shows the case where scanner 1 reads the third page ("C") of the document. When scanner 1 reads the third page of the document, document image accepting unit 160 accepts the image data on the third page of the document, as described above. Then, preview image generation unit 162 generates a preview image, and outputs the preview image to display control unit 166. Display control unit 166 performs display control for the preview image (displaying in a scrolling manner). The present example shows the case where the preview image is displayed on display unit 312 of operation panel 13, and scrolled from right to left. Furthermore, the present example also shows the state where the previous preview image on the second page of the document stops in front of the portion on which the user places his/her hand, as described above. The preview image of the image data on the third page of the document is scrolled until it overlaps with the preview image on the second page of the document.

Referring to FIG. 7(E), the figure shows the case where the preview image on the second page ("B") of the document and the preview image on the third page ("C") of the document overlap with each other, and a preview image obtained by image editing for page combination (2-in-1) is displayed. The preview image obtained by image editing for page combination is also generated by preview image generation unit 162. In this case, display control unit 166 notifies operation accepting unit 168 that the preview image on the second page ("B") of the document and the preview image on the third page ("C") of the document overlap with each other. Accordingly, operation accepting unit 168 determines that the image editing for page combination (2-in-1) has been accepted, and notifies image editing unit 164 of the accepted image editing. Then, image editing unit 164 instructs preview image generation unit 162 to generate a preview image obtained by image editing. Operation accepting unit 168 hereinafter gives notification to image editing unit 164 in the similar procedure. In addition image editing unit 164 instructs preview image generation unit 162 in the similar procedure.

Referring to FIG. 7(F), the figure shows the case where the preview image on the fourth page ("D") of the document is overlapped and a preview image obtained by image editing for page combination (4-in-1) is displayed, and then, the hand placed on region SA is moved away therefrom. The state where the hand placed on region SA is moved away therefrom means that the state of non-contact with region SA is detected. Operation accepting unit 168 notifies display control unit 166 that acceptance of image editing for page combination (4-in-1) has been ended. In this case, the stopped preview image resumes scrolling from right to left. Then, after the preview image disappears from display unit 312, display control unit 166 notifies image editing unit 164 that the process has been ended, and image editing unit 164 performs an image editing process for the image data. In this case, image editing unit 164 performs image editing for page combination into a 4-in-1 layout based on the image data on the second page to the fourth page of the document and blank image data, and outputs the resultant to image forming unit 4. Then, a printing process for recording paper sheet S is performed in image forming unit 4.

[2.2 Manner of Operation on Operation Panel (Second)]

Figure 8:
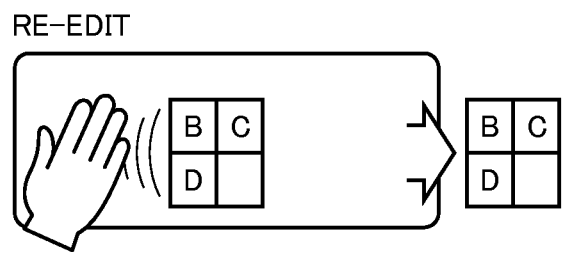
FIG. 8 is a diagram illustrating a manner of an operation (second) on operation panel 13 according to the present embodiment.

FIG. 8 is a diagram illustrating a manner of an operation (second) on operation panel 13 according to the present embodiment.

Referring to FIG. 8, the figure shows the case where the preview image on the fourth page ("D") of the document in FIG. 7(F) is overlapped and a preview image obtained by image editing for page combination (4-in-1) is displayed, and thereafter, the hand or finger placed on region SA is moved to the right. The case where the hand or finger placed on region SA is moved to the right means that it is detected that the coordinates of the touched position on the touch panel are changed, specifically, changed into the positional coordinates of the touched position to the right. Operation accepting unit 168 determines that the instruction to reset the setting of image editing for page combination (4-in-1) has been accepted in accordance with the above operation, and notifies display control unit 166 and image editing unit 164 of the accepted instruction.

In this case, display control unit 166 causes the preview image in the stopped state to be moved in the opposite direction (from left to right). Then, after the preview image disappears from display unit 312, the preview image on the second page ("B") of the document is caused to resume scrolling from right to left. In addition, although the setting of image editing for page combination into an N-in-1 layout has been accepted in accordance with the hand placed on region SA, this setting of image editing is reset by the above operation (when the hand or finger placed on region SA is moved to the right). Operation accepting unit 168 notifies image editing unit 164 to reset the setting of image editing for page combination (N-in-1).

[2.3 Manner of Operation on Operation Panel (Third)]

Figure 9:
FIG. 9 is a diagram illustrating a manner of an operation (third) on operation panel 13 according to the present embodiment.

FIG. 9 is a diagram illustrating a manner of an operation (third) on operation panel 13 according to the present embodiment.

Referring to FIG. 9, the figure shows the case where a hand is placed on region SC on the touch panel of operation panel 13, which is specifically the state where contact with region SC has been detected. Operation accepting unit 168 determines that the instruction to stop image input has been accepted in accordance with the above-described operation, and notifies display control unit 166 and image editing unit 164 of the accepted instruction.

In this case, display control unit 166 stops displaying the preview image that is scrolled from right to left. Furthermore, display control unit 166 instructs document image accepting unit 160 to stop image input from scanner 1. Consequently, input of image data from scanner 1 into document image accepting unit 160 is stopped. In addition, the explanation has been given in the present example with regard to the case where image input is stopped, it may also be possible to accept only input of image data from scanner 1 but stop generation and display of the preview image in preview image generation unit 162.

[2.4 Manner of Operation on Operation Panel (Fourth)]

Figure 10:
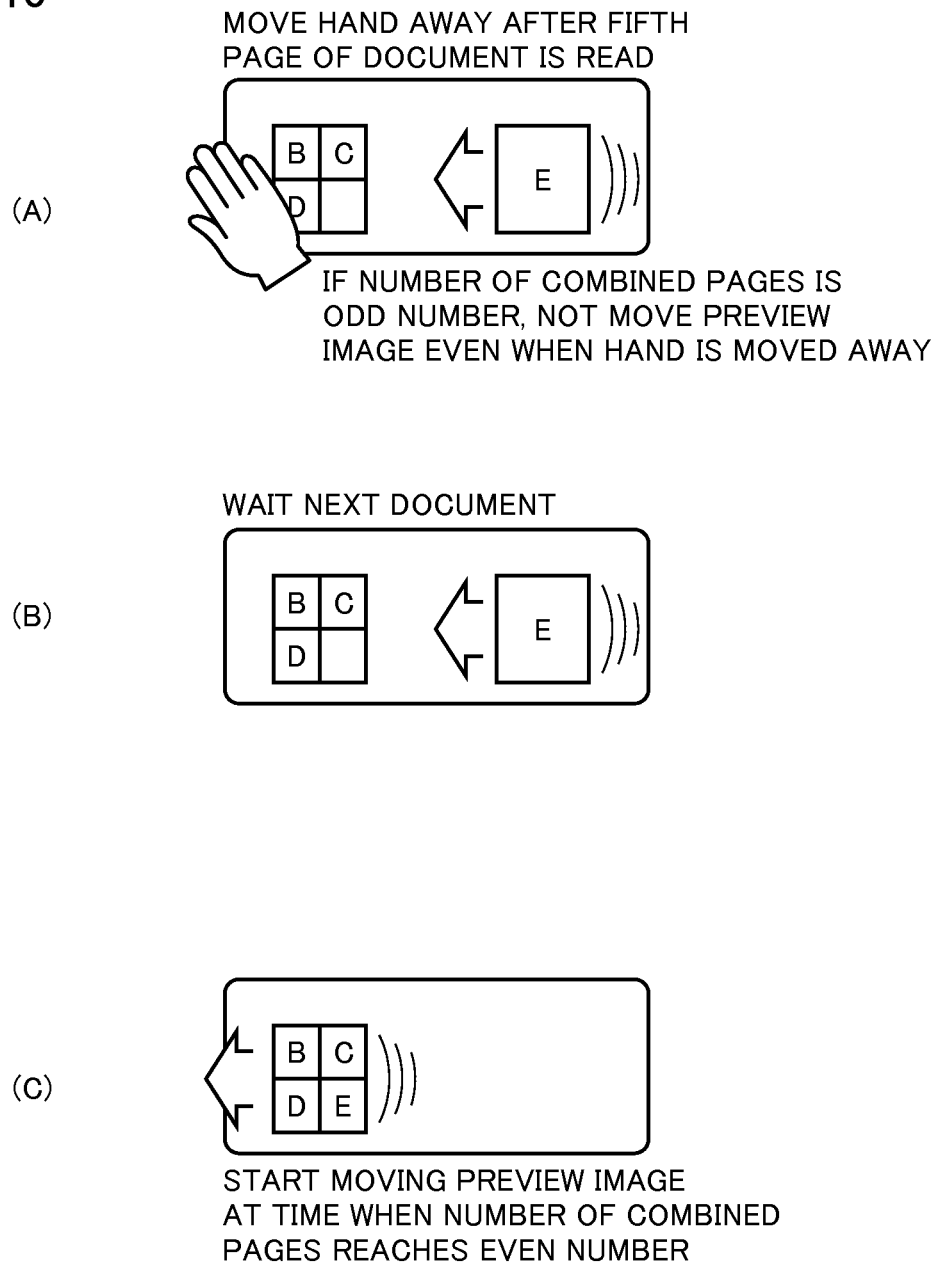
FIG. 10 is a diagram illustrating a manner of an operation (fourth) on operation panel 13 according to the present embodiment.

FIG. 10 is a diagram illustrating a manner of an operation (fourth) on operation panel 13 according to the present embodiment.

Referring to FIG. 10(A), the figure shows the case where the preview image on the fourth page ("D") of the document is overlapped and a preview image obtained by image editing for page combination (4-in-1) is displayed, and thereafter, the hand placed on region SA is moved away therefrom. Operation accepting unit 168 notifies display control unit 166 that acceptance of image editing for page combination has been ended in accordance with the above-described operation. In addition, the figure also shows the case where the preview image on the fifth page ("E") of the document is displayed in a scrolling manner. In this case, the number of combined pages in the preview image obtained by image editing for page combination (4-in-1) that has been stopped is an odd number (3 pages). Consequently, there is a blank region existing in the preview image obtained by image editing for page combination (4-in-1).

Referring to FIG. 10(B), when the preview image on the fifth page ("E") of the document is displayed in a scrolling manner, that is, when image data on the fifth page of the document is input, display control unit 166 maintains the state where the preview image obtained by image editing for page combination (4-in-1) is stopped until the number of combined pages reaches an even number. In other words, display control unit 166 waits until the next preview image (E) is scrolled and overlapped.

Referring to FIG. 10(C), the preview image on the fifth page (E) of the document is overlapped, and a preview image obtained by image editing for page combination (4-in-1) is displayed. Then, since the number of combined pages reaches an even number (4 pages), the stopped preview image resumes scrolling from right to left. In other words, display control unit 166 notifies operation accepting unit 168 that the preview image on the fifth page ("E") of the document is displayed in a scrolling manner and overlaps with the stopped preview image obtained by image editing. Thus, operation accepting unit 168 determines that image editing for page combination (4-in-1) has been accepted, and notifies image editing unit 164 of the accepted image editing.

Then, after the preview image disappears from display unit 312, display control unit 166 notifies image editing unit 164 that the process has been ended, and image editing unit 164 performs an image editing process of page combination (4-in-1) for the image data. In this case, image editing unit 164 performs image editing for page combination into a 4-in-1 layout based on the image data on the second page to the fifth page of the document, and outputs the resultant to image forming unit 4. Then, a printing process for recording paper sheet S is performed in image forming unit 4.

[2.5 Manner of Operation on Operation Panel (Fifth)]

FIG. 11 is a diagram illustrating a manner of an operation (fifth) on operation panel 13 according to the present embodiment.

Referring to FIG. 11(A), the figure shows the case where the user places his/her hand on region SB on the touch panel of operation panel 13, which is specifically the case where contact with region SB has been detected.

In the above-described case, the preview image stops in a region (for example, region SC) in front of the portion on which the user places his/her hand (the position with which the user's hand comes into contact). Furthermore, by the above-described operation, that is, by the user placing his/her hand on region SB, operation accepting unit 168 accepts setting of image editing for page combination (N-in-1) on the back surface. Then, operation accepting unit 168 notifies display control unit 166 and image editing unit 164 of the accepted setting. The present example shows, as image editing for page combination on the back surface, the case where the preview images on the second to fourth pages of the document overlap with one another, and a preview image obtained by image editing for page combination (4-in-1) is displayed.

Referring to FIG. 11(B), the figure shows the case where preview images on the second to fourth pages of the document overlap with one another and a preview image obtained by image editing for page combination (4-in-1) is displayed, and thereafter, the hand placed on region SB is moved away therefrom. The case where the hand placed on region SB is moved away therefrom means that the state of non-contact with region SB has been detected. Operation accepting unit 168 notifies display control unit 166 that acceptance of image editing for page combination (4-in-1) on the back surface has been ended, in which case the stopped preview image resumes scrolling from right to left. Then, after the preview image disappears from display unit 312, display control unit 166 notifies image editing unit 164 that the process has been ended, and image editing unit 164 performs an image editing process for page combination on the back surface for the image data. In this case, image editing unit 164 performs image editing such that the image data corresponding to the previous preview image on the first page ("A") of the document appears on the front surface of the document while the image data corresponding to the preview image combined into a 4-in-1 layout based on the image data on the second to fourth pages of the document appears on the back surface of the document. Then, image editing unit 164 outputs the resultant to image forming unit 4. Then, a double-sided printing process for recording paper sheet S is performed in image forming unit 4.

[2.6 Manner of Operation on Operation Panel (Sixth)]

FIG. 12 is a diagram illustrating a manner of an operation (sixth) on operation panel 13 according to the present embodiment.

Referring to FIG. 12(A), the figure shows the case where the user touches region SD1 or SD2 on the touch panel of operation panel 13. By the user touching region SD1 or SD2, operation accepting unit 168 determines that the instruction to display a detail setting screen has been accepted, and notifies display control unit 166 and image editing unit 164 of the accepted instruction. Then, the detail setting screen is displayed as in the present example. Then, when the user touches region SD1 on the touch panel of operation panel 13, the detail setting screen for the stopped preview image is displayed. On the other hand, when the user touches region SD2 on the touch panel of operation panel 13, the detail setting screen for the scrolling preview image is displayed. The present example shows the state where the user places his/her hand on region SA while the preview image on the first page ("A") of the document is stopped. In this case, the setting of image editing for page combination (N-in-1) described above is accepted. The present example also shows the state where the preview image on the second page ("B") of the document is being scrolled.

Referring to FIG. 12(B), the figure shows the case where the user touches the detail setting screen displayed on operation panel 13. Specifically, on the detail setting screen, it is possible to select paper size, double-sided printing, document mode, stamp, and the like. On the detail setting screen in FIG. 12(A), the document mode is color. On the detail setting screen in FIG. 12(B), the document mode is changed to monochrome.

In the present example, it is assumed that the user touches region SD2 on the touch panel of operation panel 13. In other words, it is assumed that the detail setting screen for the input preview image that is being scrolled is displayed, and the detail setting for this input image is accepted. Operation accepting unit 168 notifies image editing unit 164 about acceptance of the detail setting.

Referring to FIG. 12(C), the figure shows the state where "monochrome" is selected as the document mode and "background" removing processing is selected as the image processing on the detail setting screen, and these settings are accepted.

Referring to FIG. 12(D), the figure shows the case where the preview image on the second page ("B") of the document overlaps with the preview image on the first page ("A") of the document, and a preview image obtained by image editing for page combination (2-in-1) is displayed. In addition, the preview image obtained by image editing is implemented by accepting the detail setting on the above-described detail setting screen, and thereby accepting the setting in which the preview image on the first page ("A") of the document is set as color in the document mode while the preview image on the second page ("B") of the document is set as monochrome in the document mode.

Then, after the preview image disappears from display unit 312, display control unit 166 notifies image editing unit 164 that the process has been ended, and image editing unit 164 performs an image editing process of page combination for the image data. In this case, image editing unit 164 performs image editing so as to achieve the image data corresponding to a 2-in-1 preview image (such that the preview image on the first page ("A") of the document is color while the preview image on the second page ("B") of the document is monochrome), and outputs the resultant to image forming unit 4. Then, a printing process for recording paper sheet S is performed in image forming unit 4.

[2.7 Manner of Operation on Operation Panel (Seventh)]

FIG. 13 is a diagram illustrating a manner of an operation (seventh) on operation panel 13 according to the present embodiment.

In the present example, the operation for post-processing editing will be described.

Referring to FIG. 13(A), the figure shows the case where scanner 1 first reads the first page ("A") of the document. When scanner 1 reads the document, document image accepting unit 160 accepts the image data on the first page of the document. Then, preview image generation unit 162 generates a preview image of this image data, and outputs this preview image to display control unit 166. Then, display control unit 166 performs display control for the preview image (displaying in a scrolling manner). In the present example, the figure shows the case where a preview image is displayed on display unit 312 of operation panel 13, and scrolled from right to left.

Referring to FIG. 13(B), the figure shows the case where an inner area of the preview image on the first page ("A") of the document is touched. Specifically, the figure shows the case where the upper left region within the preview image is touched. By touching the inner area of the preview image, operation accepting unit 168 determines that the setting for staple editing that is post-processing editing has been accepted, and notifies display control unit 166 and image editing unit 164 of the accepted setting.

Furthermore, the preview image is stopped at that time. Since the upper left region within the preview image is touched, the staple position accepted for staple editing is set at the upper left position.

When the upper region within the preview image is touched, operation accepting unit 168 accepts a setting of staple editing for stapling at the upper left on the recording paper sheet. On the other hand, when the lower region within the preview image is touched, operation accepting unit 168 accepts a setting of staple editing for stapling at the lower left on the recording paper sheet. Operation accepting unit 168 notifies image editing unit 164 of the accepted settings.

Referring to FIG. 13(C), the present example shows the case where, in the state in FIG. 13(B), the preview image on the subsequent page of the document having the page number of more than one is overlapped and staple editing is accepted.

Referring to FIG. 13(D), the present example shows the case where touching on an inner area of the preview image is cancelled, which is specifically the state where it is detected that the finger placed on the inner area of the preview image is not touched. Operation accepting unit 168 notifies display control unit 166 that acceptance of staple editing has been ended, in which case the preview image formed of a plurality of stopped pages resumes scrolling from right to left. Then, after the preview image disappears from display unit 312, display control unit 166 notifies image editing unit 164 that the process has been ended, and image editing unit 164 performs an image editing process for the image data. In this case, image editing unit 164 performs a normal image editing process such as noise rejection for the image data, and outputs the resultant to image forming unit 4. Then, a printing process for recording paper sheet S is performed in image forming unit 4. Then, the recording paper sheet having been subjected to the printing process is conveyed to post-processing device FS, where the accepted stapling process for stapling at the upper left position is performed.

Referring to FIG. 13(E), the figure shows the case where an inner area of the preview image on the first page ("A") of the document is touched, which is specifically the case where the lower left region within the preview image is touched. In this case, since the lower left region within the preview image is touched, the staple position accepted in staple editing is set at the lower left position. The stapling process for stapling at the accepted lower left position is subsequently performed in the post-processing device by the same process as described above.

In addition, the process is not limited to the above, but the staple position to be accepted can also be changed by designating another position within the preview image.

Figure 14:
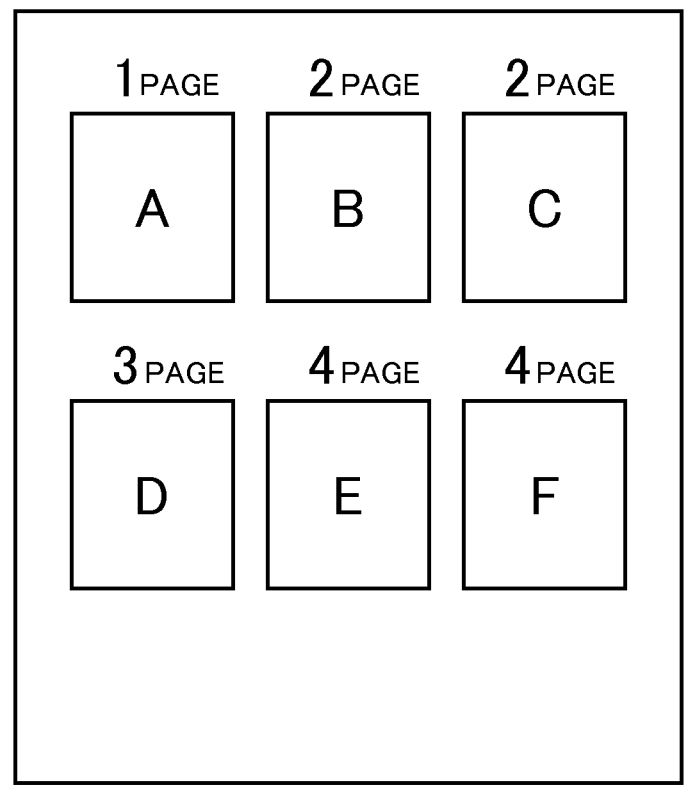
FIG. 14 is a diagram illustrating a thumbnail image according to the present embodiment.

FIG. 14 is a diagram illustrating a thumbnail image according to the present embodiment.

Referring to FIG. 14, the figure shows the relation between thumbnail images of corresponding image data on the first page to the sixth page ("A" to "F") of the document and output pages.

The figure shows the case where image data "A" on the first page of the document is output onto the first page of the recording paper sheets; image data "B" on the second page of the document is output onto the second page of the recording paper sheets; and image data "C" on the third page of the document is output onto the second page of recording paper sheets. Thus, image editing into an N-in-1 layout is performed, in which case image editing into a 2-in-1 layout is performed. The figure also shows the case where image data "D" on the fourth page of the document is output onto the third page of the recording paper sheets; image data "E" on the fifth page of the document is output onto the fourth page of the recording paper sheets; and image data "F" on the sixth page of the document is output onto the fourth page of the recording paper sheets. Thus, image editing into an N-in-1 layout is performed, in which case image editing into a 2-in-1 layout is performed.

By providing output of the list showing the relation between the thumbnail images and the output pages (in the present example, a thumbnail print by way of example), the user can readily understand the relation between the document and the output pages.

[3. Description of Process Flow]
[3.1 Entire Flow Diagram]

The flow of the process of accepting an operation input on operation panel 13 as described above will be hereinafter described.

Figure 15:
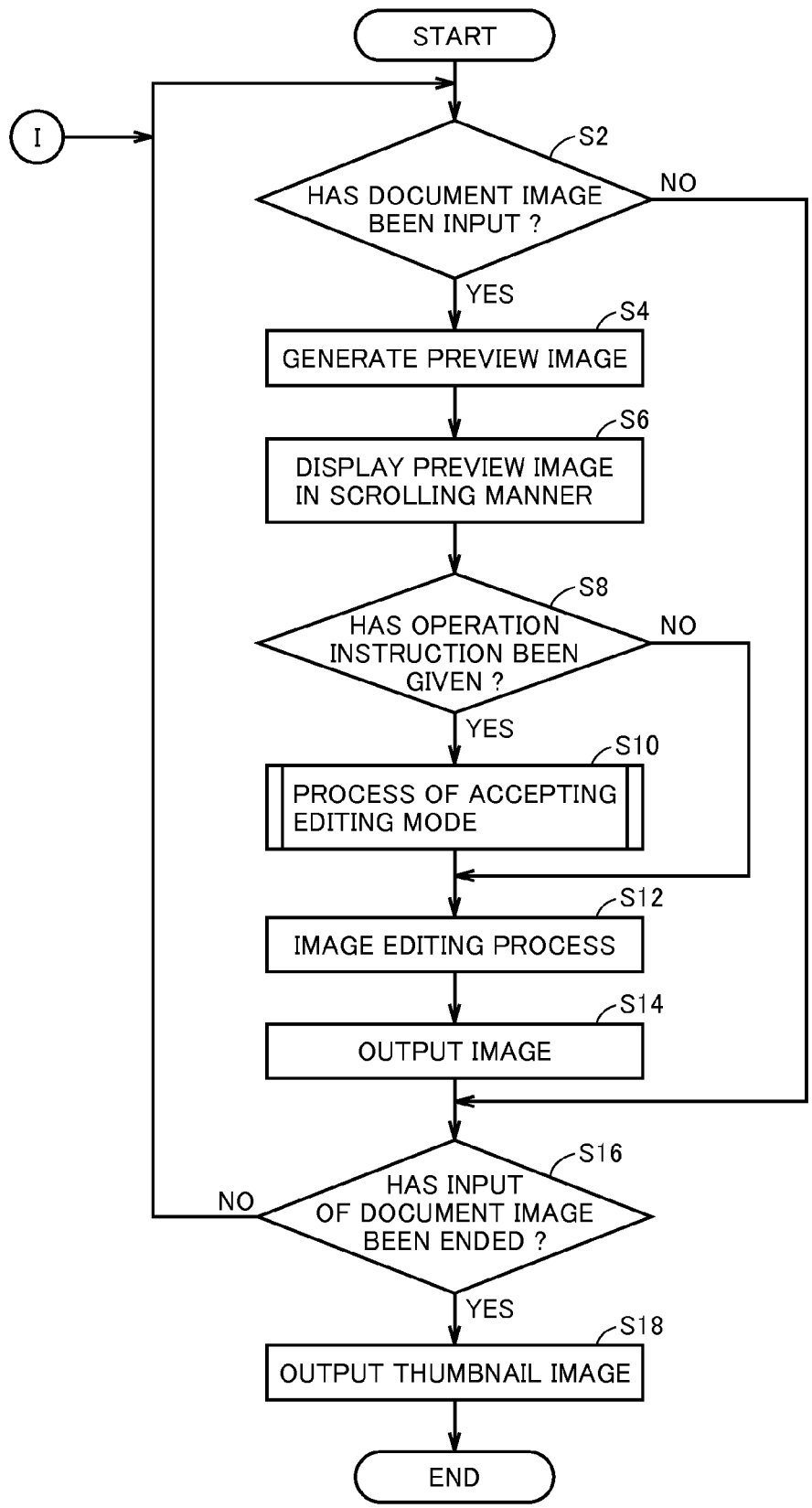
FIG. 15 is a flow diagram illustrating an overall process of the image forming apparatus according to the present embodiment.

FIG. 15 is a flow diagram illustrating an overall process of the image forming apparatus according to the present embodiment. This process is mainly a process in CPU 151 of main control unit 150.

Referring to FIG. 15, it is first determined whether or not a document image has been input (step S2), which is specifically determined based on whether or not document image accepting unit 160 has accepted input of image data from scanner 1.

In step S2, when it is determined that a document image has been input (YES in step S2), a preview image is generated (step S4). Specifically, preview image generation unit 162 generates a preview image based on the image data accepted by document image accepting unit 160.

Then, the preview image is displayed in a scrolling manner (step S6). Specifically, display control unit 166 causes the generated preview image to be displayed in a scrolling manner on display unit 312 of the operation panel. In the present example, the preview image is displayed such that it is scrolled from right to left.

Then, it is determined whether or not an operation instruction has been given (step S8), which is specifically determined based on whether or not an operation input instruction has been given to operation accepting unit 168 through the touch panel of operation panel 13.

When it is determined that an operation instruction has been given (YES in step S8), a process of accepting an editing mode for performing a process of accepting image editing or post-processing editing is performed (step S10). The details of the process of accepting an editing mode will be described later. Specifically, operation accepting unit 168 performs a process of accepting various types of image editing or post-processing editing, and outputs the resultant to display control unit 166 and image editing unit 164.

Then, an image editing process is performed for the preview image (step S12). Specifically, an image editing process is performed in image editing unit 164. When the process of accepting, for example, the image editing for page combination into an N-in-1 layout is performed in the process of accepting an editing mode, this image editing is performed. On the other hand, when it is determined in step S8 that an operation instruction has not been given (NO in step S8), image editing unit 164 performs for example only an image editing process such as noise rejection in step S12.

Then, an image is output (step S14). Specifically, image editing unit 164 outputs the edited image data to image forming unit 4. Then, image forming unit 4 prints the image data on a recording paper sheet.

Then, it is determined whether or not input of the document image has been ended (step S16). Specifically, document image accepting unit 160 determines whether or not input of the image data has been ended. Then, document image accepting unit 160 notifies image editing unit 164 that input of the image data has been ended.

When it is determined in step S16 that input of the document image has been ended (YES in step S16), a thumbnail image is output (step S18). Specifically, a thumbnail image as described with reference to FIG. 14 is output. In the case where the process of accepting image editing, for example, into an N-in-1 page layout is performed when input of image data has been ended, image editing unit 164 edits the thumbnail image accordingly. Then, image forming unit 4 prints the edited image data on a recording paper sheet.

Then, the process ends (end).

When it is determined in step S16 that input of the document image has not been ended (NO in step S16), the process returns to step S2 again, and the same process is repeated.

Furthermore, when it is determined in step S2 that a document image has not been input (NO in step S2), the process proceeds to step S16. Subsequent processes are performed in a similar manner.

[3.2 Entire Flow of Editing Mode]

The flow of the process of accepting an editing mode will then be described.

Figure 16:
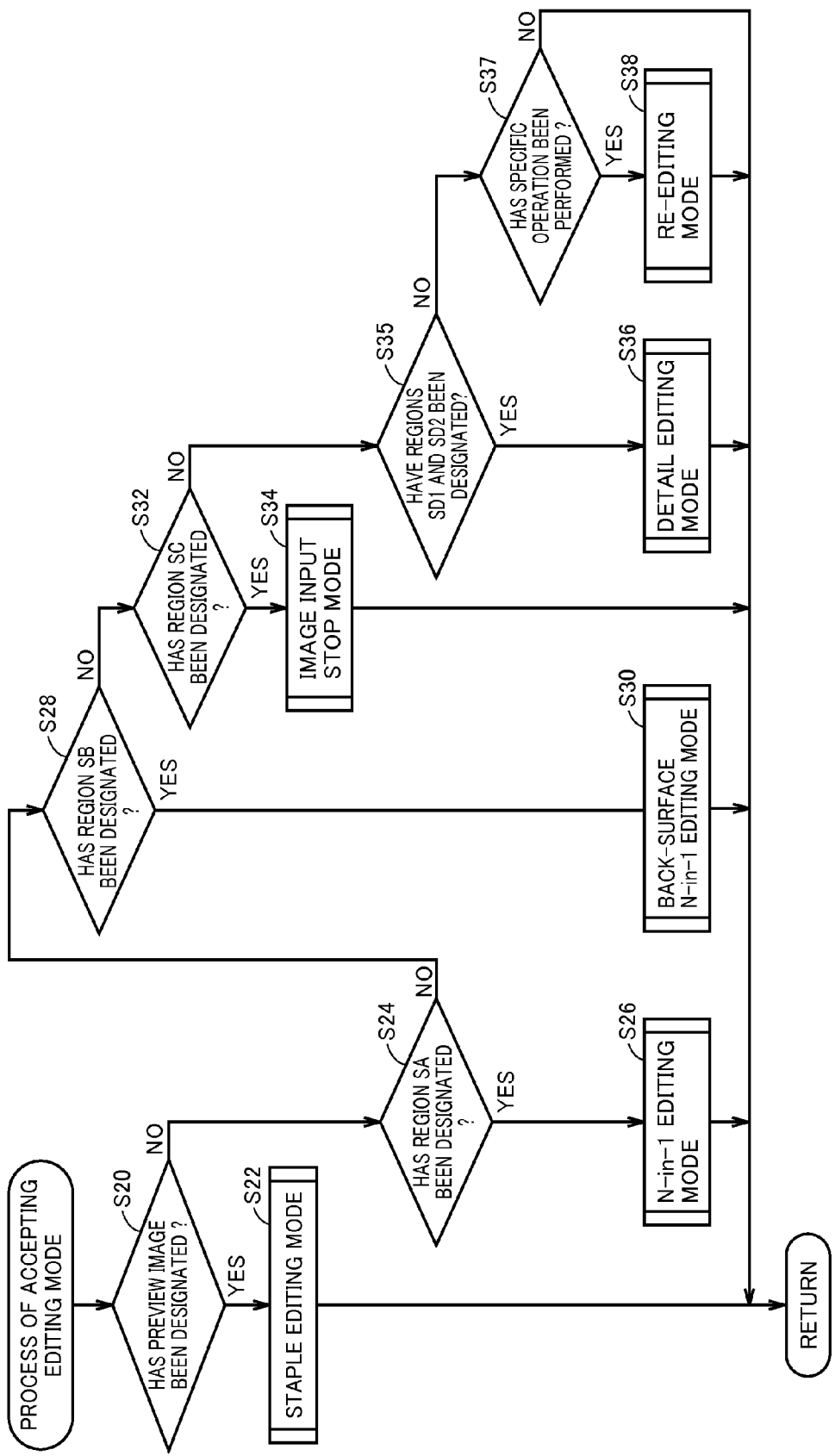
FIG. 16 is a flow diagram illustrating a process of accepting an editing mode according to the present embodiment.

FIG. 16 is a flow diagram illustrating a process of accepting an editing mode according to the present embodiment. The flow diagram mainly shows a process in display control unit 166 and image editing unit 164 that is performed in accordance with the operation input in operation accepting unit 168.

Referring to FIG. 16, it is first determined whether or not a preview image has been designated (step S20). Specifically, operation accepting unit 168 determines whether or not an inner area of the preview image has been touched.

When it is determined in step S20 that a preview image has been designated (YES in step S20), the editing mode is shifted to a staple editing mode (step S22). Specifically, operation accepting unit 168 notifies display control unit 166 and image editing unit 164 that the editing mode has been shifted to the staple editing mode. Then, the process ends (return). The details of the staple editing mode will be described later.

On the other hand, when it is determined in step S20 that the preview image has not been designated (NO in step S20), operation accepting unit 168 then determines whether or not region SA has been designated (step S24).

When it is determined in step S24 that region SA has been designated (YES in step S24), the editing mode is shifted to an N-in-1 editing mode (step S26). Specifically, operation accepting unit 168 notifies display control unit 166 and image editing unit 164 that the editing mode has been shifted to the N-in-1 editing mode. Then, the process ends (return). The details of the N-in-1 editing mode will be described later.

Then, when it is determined in step S24 that region SA has not been designated (NO in step S24), operation accepting unit 168 then determines whether or not region SB has been designated (step S28). When it is determined in step S28 that region SB has been designated (YES in step S28), the editing mode is shifted to a back-surface N-in-1 editing mode (step S30). Specifically, operation accepting unit 168 notifies display control unit 166 and image editing unit 164 that the editing mode has been shifted to the back-surface N-in-1 editing mode. Then, the process ends (return). The details of the back-surface N-in-1 editing mode will be described later.

On the other hand, when it is determined in step S28 that region SB has not been designated (NO in step S28), operation accepting unit 168 determines whether or not region SC has been designated (step S32).

When it is determined in step S32 that region SC has been designated (YES in step S32), an operation mode is shifted to an image input stop mode (step S34). Specifically, operation accepting unit 168 notifies display control unit 166 and image editing unit 164 that the operation mode has been shifted to the image input stop mode. Then, the process ends (return). The details of the image input stop mode will be described later.

When it is determined in step S32 that region SC has not been designated (NO in step S32), operation accepting unit 168 then determines whether or not regions SD1 and SD2 have been designated (step S35). When it is determined in step S35 that regions SD1 and SD2 have been designated (YES in step S35), the editing mode is shifted to a detail editing mode (step S36). Specifically, operation accepting unit 168 notifies display control unit 166 and image editing unit 164 that the editing mode has been shifted to the detail editing mode. Then, the process ends (return). The details of the detail editing mode will be described later.

On the other hand, when it is determined in step S35 that regions SD1 and SD2 have not been designated (NO in step S35), operation accepting unit 168 determines whether or not a specific operation has been performed (step S37). The specific operation used herein means an operation of moving a hand or a finger, for which contact was detected, in the direction opposite to the moving direction of the scrolled image, for example, as shown in FIG. 8.

When it is determined in step S37 that a specific operation has been performed (YES in step S37), the editing mode is shifted to a re-editing mode (step S38). Specifically, operation accepting unit 168 notifies display control unit 166 and image editing unit 164 that the editing mode has been shifted to the re-editing mode. Then, the process ends (return). The details of the re-editing mode will be described later.

When it is determined in step S37 that the specific operation has not been performed (NO in step S37), it is determined that the relevant operation instruction is not given, and then, the process ends (return).

[3.3 N-in-1 Editing Mode]

Figure 17:
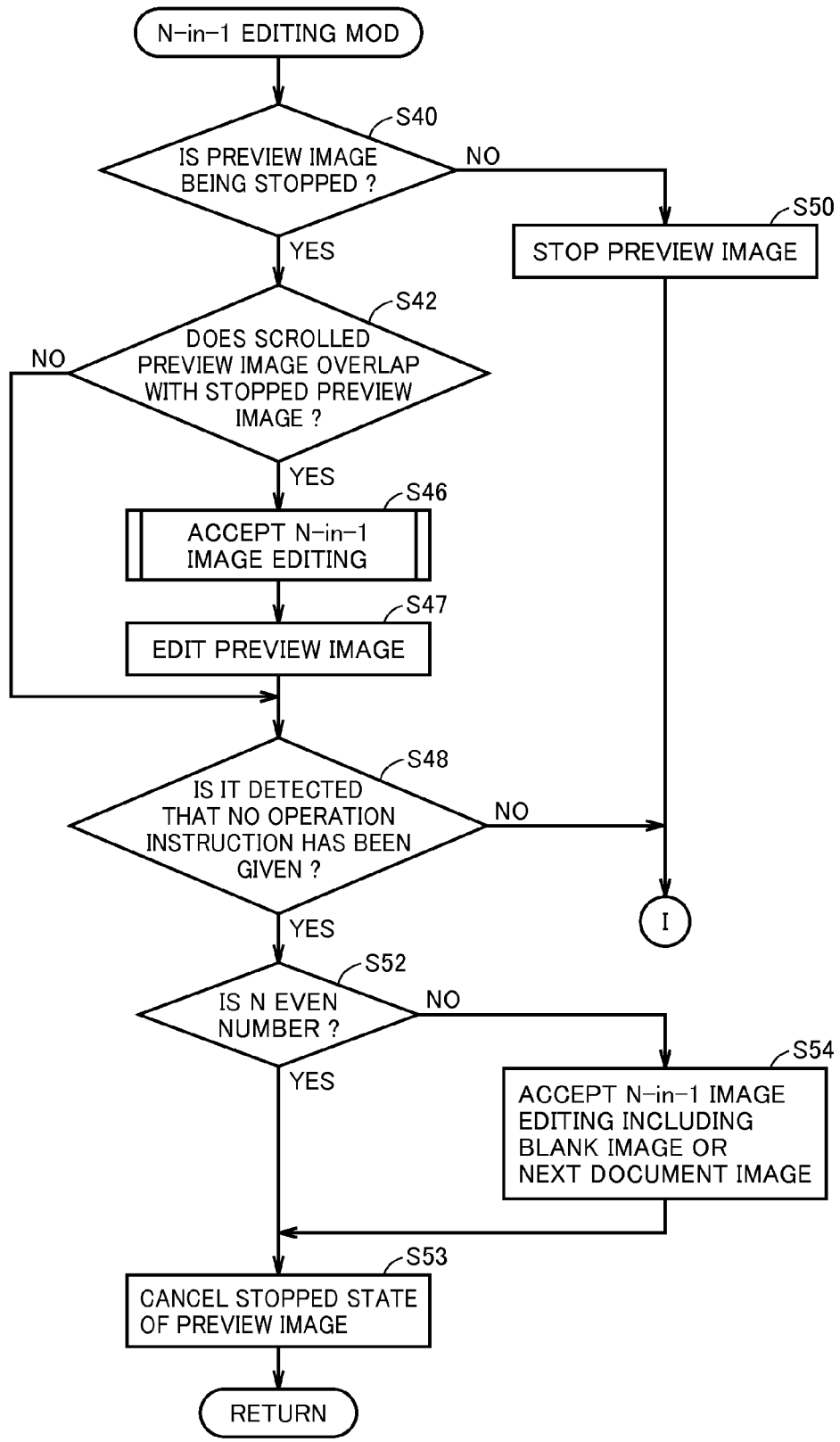
FIG. 17 is a flow diagram illustrating a process of an N-in-1 editing mode according to the present embodiment.

FIG. 17 is a flow diagram illustrating a process of an N-in-1 editing mode according to the present embodiment.

Referring to FIG. 17, it is first determined whether or not a preview image is being stopped (step S40). Specifically, when the editing mode is shifted to the N-in-1 editing mode in accordance with the notification from operation accepting unit 168, display control unit 166 determines whether or not the preview image is being stopped.

When it is determined in step S40 that the preview image is being stopped (YES in step S40), it is determined whether or not the scrolled preview image overlaps with the stopped preview image (step S42).

Then, the process of accepting N-in-1 image editing is performed (step S46). When two preview images overlap with each other, image editing for page combination (2-in-1) is accepted. Specifically, display control unit 166 notifies operation accepting unit 168 that two preview images overlap with each other. Accordingly, operation accepting unit 168 accepts the image editing for page combination (2-in-1), and notifies image editing unit 164 of the accepted image editing. Then, the preview image is edited (step S47). Specifically, image editing unit 164 gives an instruction to preview image generation unit 162. For example, when two preview images overlap with each other, a preview image in a 2-in-1 layout is displayed. Then, the process proceeds to step S48.

Furthermore, also when it is determined in step S42 that the scrolled preview image does not overlap with the stopped preview image (NO in step 42), the process proceeds to step S48.

Then, it is determined whether it is detected or not that no operation instruction has been given (step S48). Specifically, it is determined whether or not the state where touching on region SA of the touch panel has been detected is shifted to the state where touching on region SA of the touch panel has not been detected. In other words, operation accepting unit 168 determines whether or not acceptance of image editing for page combination (N-in-1) has been ended.

In step S48, when it is detected that no operation instruction has been given (YES in step S48), that is, when touching on region SA of the touch panel is not detected, it is determined whether N is an even number or not (step S52). In other words, it is determined whether N representing the number of pages of the document to be combined is an even number or not. Specifically, operation accepting unit 168 notifies display control unit 166 that acceptance has been ended, and display control unit 166 determines whether the number of combined preview images (N) is an even number or not.

When it is determined in step S52 that N is an even number (YES in step S52), the stopped state of the preview image is canceled (step S53). Specifically, when determining that the number of combined preview images (N) is an even number, display control unit 166 causes the stopped preview image to resume scrolling from right to left.

Then, the process ends (return).

On the other hand, when it is determined in step S52 that N is not an even number (NO in step S52), the process of accepting image editing for page combination (N-in-1) including a blank image or the next document image is performed (step S54). Specifically, when it is determined that the number of combined preview images (N) is not an even number, and when the next preview image is input, display control unit 166 maintains the state where the preview image is stopped. Then, when the next preview image is scrolled and overlaps with the stopped preview image, display control unit 166 notifies operation accepting unit 168 that the preview image displayed in a scrolling manner overlaps with the stopped preview image. Thus, operation accepting unit 168 determines that the image editing for page combination has been accepted, and notifies image editing unit 164 of the accepted image editing. Then, the process proceeds to step S53. When the next preview image is not input, display control unit 166 does not maintain the state where the preview image is stopped, but causes the stopped preview image to resume scrolling from right to left. Furthermore, display control unit 166 notifies operation accepting unit 168 that the number of combined pages (N) is an odd number, and operation accepting unit 168 determines that the image editing for page combination including a blank image has been accepted, and notifies image editing unit 164 of the accepted image editing.

On the other hand, when it is determined in step S40 that the preview image is not being stopped (NO in step S40), the preview image is stopped (step S50). Specifically, display control unit 166 determines whether or not the preview image is being stopped. If the preview image is not being stopped, display control unit 166 causes the preview image to be stopped.

Then, the process proceeds to "I", that is, returns to step S2 in FIG. 15. In other words, the process proceeds to the process for the next document image.

Furthermore, in step S48, when it is not detected that no operation instruction has been given (NO in step S48), the process also proceeds to "I". In other words, the process proceeds to the process for the next document image.

Then, the process ends (return).

Figure 18:
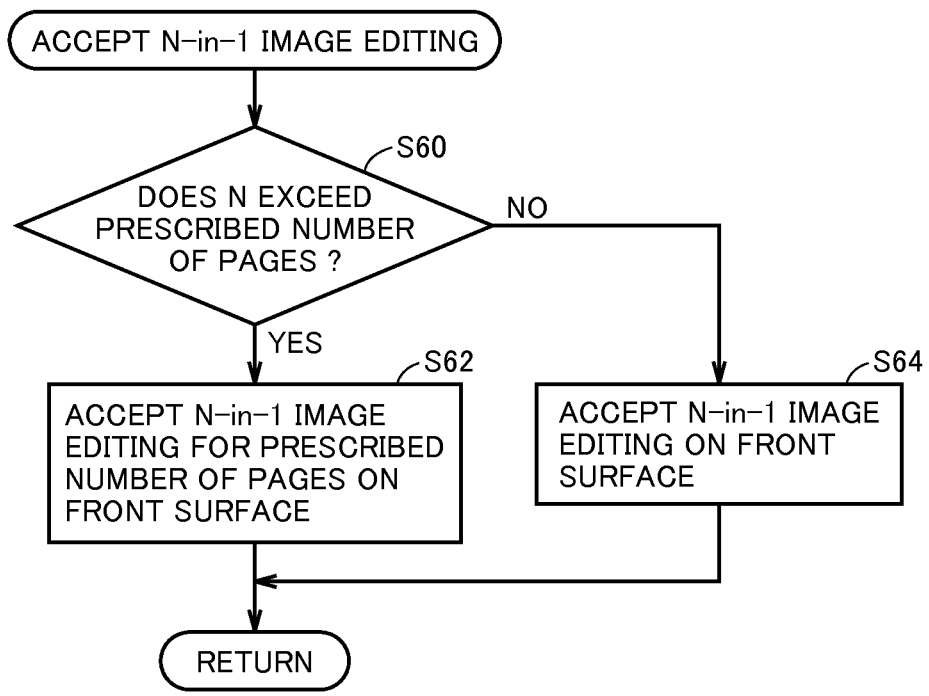
FIG. 18 shows a subroutine process in a process of accepting image editing for page combination (N-in-1) according to the present embodiment.

FIG. 18 shows a subroutine process in a process of accepting image editing for page combination (N-in-1) according to the present embodiment.

This process is for accepting image editing of the image data combined on the back surface of the print sheet when the number of combined pages of the document exceeds a prescribed number of pages.

Referring to FIG. 18, it is determined whether or not N exceeds the prescribed number of pages (step S60). For example, the prescribed number of pages may be 16. Operation accepting unit 168 determines whether or not the number of combined preview images exceeds the prescribed number of pages.

When it is determined in step S60 that N exceeds the prescribed number of pages (YES in step S60), N-in-1 image editing for the prescribed number of pages is accepted on the front surface while N-in-1 image editing for the remaining number of pages is accepted on the back surface (step S62). Specifically, when it is determined that the number of combined preview images exceeds the prescribed number of pages in accordance with the notification from display control unit 166 to operation accepting unit 168, operation accepting unit 168 determines that N-in-1 image editing for the prescribed number of pages has been accepted on the front surface while N-in-1 image editing for the remaining number of pages has been accepted on the back surface, which is then notified to image editing unit 164.

Then, the process ends (return).

When it is determined in step S60 that N does not exceed the prescribed number of pages (NO in step S60), the image editing for an N-in-1 layout is accepted on the front surface (step S64). Specifically, when it is determined that the number of combined preview images does not exceed the prescribed number of pages in accordance with the notification from display control unit 166 to operation accepting unit 168, operation accepting unit 168 determines that N-in-1 image editing for the prescribed number of pages has been accepted on the front surface, and notifies image editing unit 164 of the accepted image editing.

Then, the process ends (return).

In addition, for example, when the number of combined pages exceeds the prescribed number of pages on each of the front surface and the back surface, the process of accepting N-in-1 image editing may be forcibly ended.

The above-described process allows acceptance of the image editing for page combination that has been described with reference to FIG. 7.

[3.3A Back-Surface N-in-1 Editing Mode]

The back-surface N-in-1 editing mode is basically different only in that the back surface is subjected to image editing, but basically the same as the N-in-1 editing mode that has been described with reference to FIG. 17, and therefore, the detailed description thereof will not be repeated.

In addition, when the number of combined pages on the back surface of the document exceeds the prescribed number of pages, the process of accepting N-in-1 image editing is forcibly ended.

The above-described process allows acceptance of the image editing for page combination on the back surface as having been described with reference to FIG. 11(A).

[3.4 Image Input Stop Mode]

Figure 19:
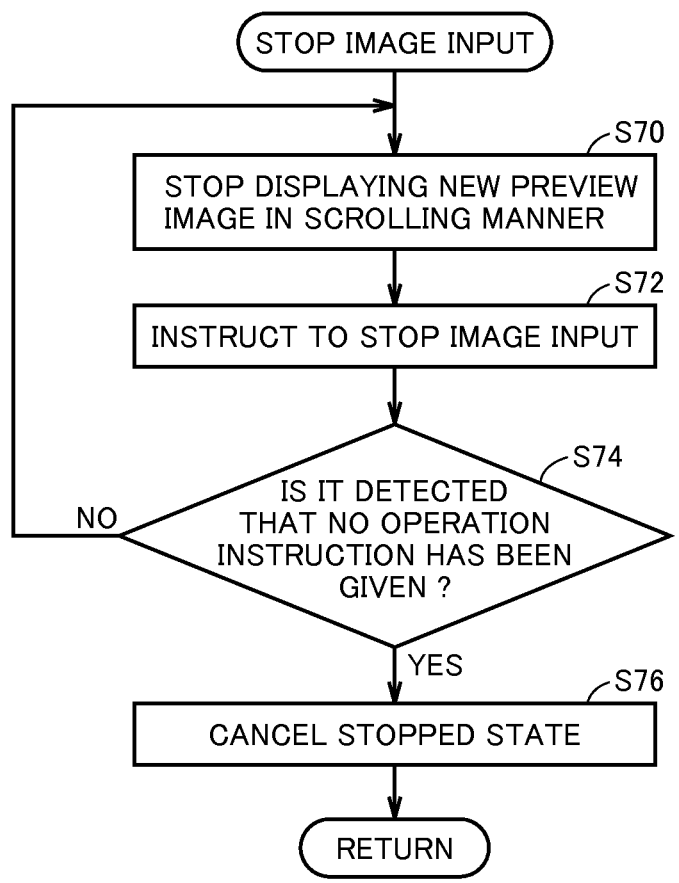
FIG. 19 is a flow diagram illustrating a process of an image input stop mode according to the present embodiment.

FIG. 19 is a flow diagram illustrating a process of the image input stop mode according to the present embodiment.

Referring to FIG. 19, a new preview image that is displayed in a scrolling manner is first stopped (step S70). When shifting to the image input stop mode in accordance with the notification from operation accepting unit 168, display control unit 166 causes the preview image to stop scrolling within operation panel 13.

Then, an instruction to stop image input is given (step S72). Display control unit 166 instructs document image accepting unit 160 to stop accepting image input.

Then, it is determined whether it is detected or not that no operation instruction has been given (step S74). Specifically, it is determined whether or not the state where touching on region SC of the touch panel has been detected is shifted to the state where touching on region SC of the touch panel has not been detected. Specifically, operation accepting unit 168 determines whether or not acceptance of stop of image input has been ended.

In step S74, when it is detected that no operation instruction has been given (YES in step S74), the stopped state is canceled (step S76). Specifically, when acceptance of stop of image input has been ended, operation accepting unit 168 notifies display control unit 166 that acceptance of stop of image input has been ended. Then, display control unit 166 causes the preview image to resume scrolling within operation panel 13. Furthermore, display control unit 166 cancels the state where acceptance of image input is stopped in document image accepting unit 160.

Then, the process ends (return).

On the other hand, in step S74, when it is not detected that no operation instruction has been given (NO in step S74), the process returns to step S70, in which the stopped state is maintained.

The above-described process allows acceptance of stop of image input as having been described with reference to FIG. 9.

[3.5 Detail Editing Mode]

Figure 20:
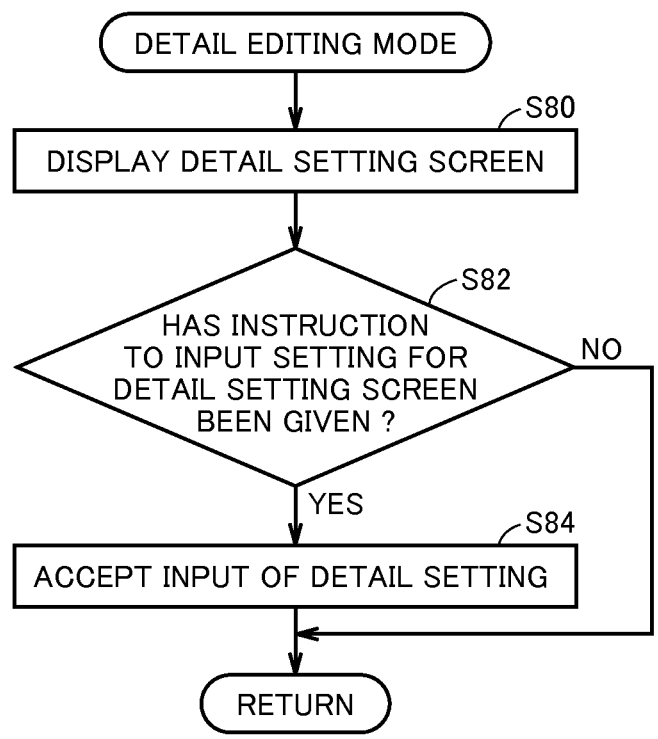
FIG. 20 is a flow diagram illustrating a process of a detail editing mode according to the present embodiment.

FIG. 20 is a flow diagram illustrating a process of a detail editing mode according to the present embodiment.

Referring to FIG. 20, a detail setting screen is first displayed (step S80). In the case where touching on region SD1 of the touch panel within operation panel 13 is detected when the editing mode is shifted to the detail editing mode in accordance with the notification from operation accepting unit 168, display control unit 166 causes a detail setting screen for the stopped preview image (FIG. 12) to be displayed.

On the other hand, in the case where touching on region SD2 of the touch panel within operation panel 13 is detected when the editing mode is shifted to the detail editing mode in accordance with the notification from operation accepting unit 168, display control unit 166 causes a detail setting screen for the scrolled preview image to be displayed.

Then, it is determined whether or not an instruction to input a setting for the detail setting screen has been given (step S82). Specifically, operation accepting unit 168 determines whether or not an instruction to input a setting has been given.

When it is determined in step S82 that an instruction to input a setting for the detail setting screen has been given (YES in step S82), input of the detail setting is accepted (step S84). Operation accepting unit 168 accepts input of the detail setting, and notifies image editing unit 164 about the accepted input of the detail setting.

Then, the process ends (return).

On the other hand, when it is determined in step S82 that an instruction to input a setting for the detail setting screen has not been given (NO in step S82), the process ends without accepting input of the detail setting (return).

In addition, display control unit 166 may cause the scrolling preview image to be stopped for a prescribed time period when region SD2 on the touch panel is touched and the detail setting screen is displayed, or may delay displaying a new scrolling preview image for a prescribed time period when region SD1 is touched and the detail setting screen is displayed.

The above-described process allows acceptance of the detail setting for the preview image obtained by image editing, as having been described with reference to FIG. 12.

[3.6 Re-Editing Mode]

Figure 21:
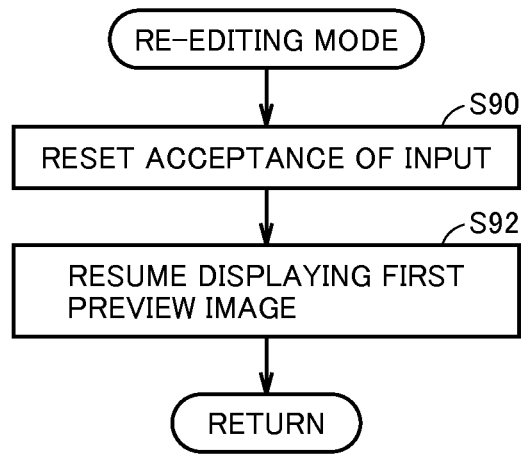
FIG. 21 is a flow diagram illustrating a process of a re-editing mode according to the present embodiment.

FIG. 21 is a flow diagram illustrating a process of the re-editing mode according to the present embodiment.

Referring to FIG. 21, acceptance of input is first reset (step S90). Specifically, when the editing mode is shifted to a re-editing mode in accordance with the notification from operation accepting unit 168, display control unit 166 causes the stopped preview image to be moved in the opposite direction (from left to right). Furthermore, operation accepting unit 168 provides notification to image editing unit 164 to reset the setting for image editing.

Then, display of the first preview image is resumed (step S92). After the preview image disappears from display unit 312, display control unit 166 again performs a display process for scrolling the first preview image from right to left.

Then, the process ends (return).

The above-described process allows acceptance of image editing for re-editing as having been described with reference to FIG. 8.

[3.7 Staple Editing Mode]

Figure 22:
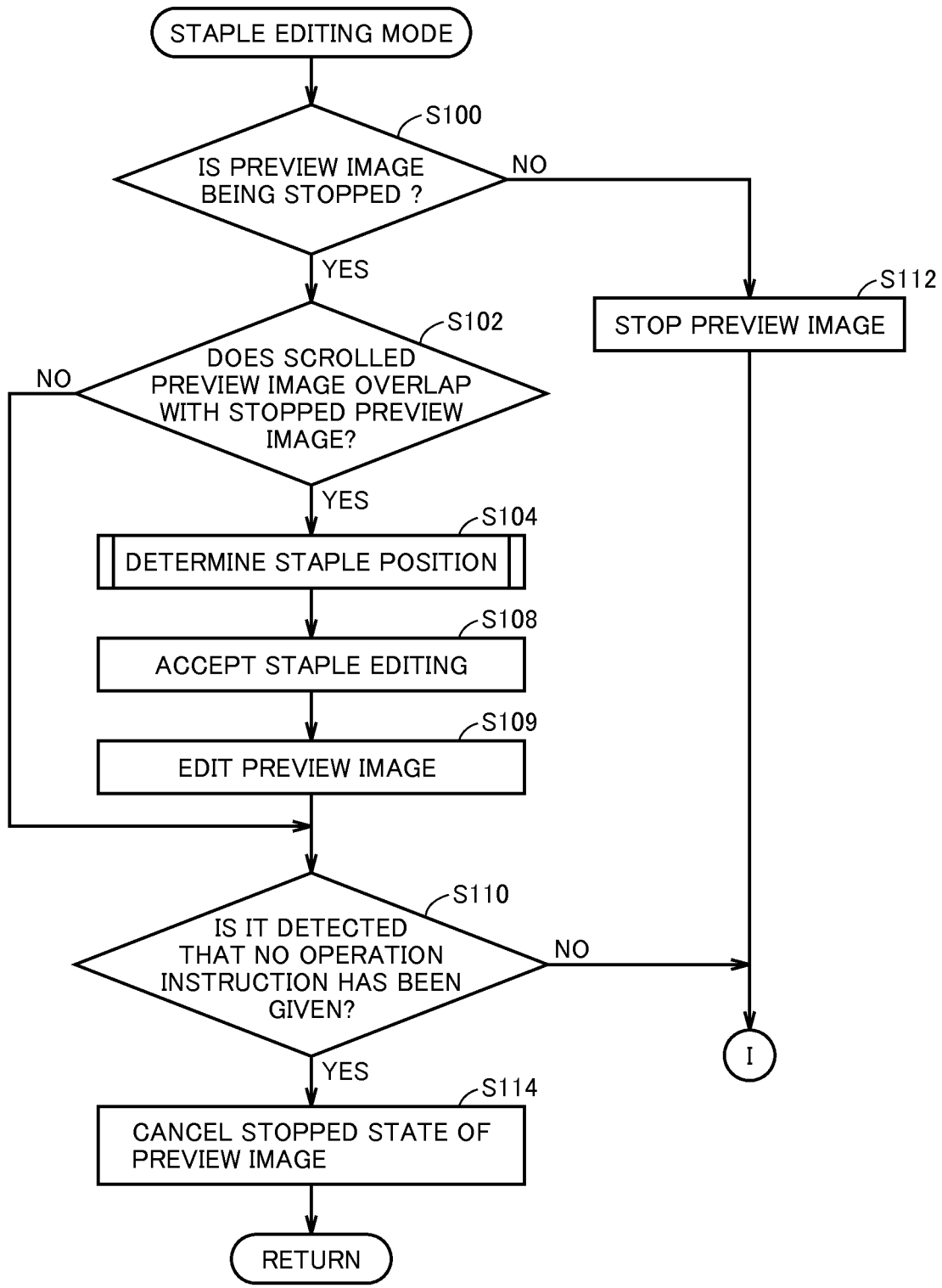
FIG. 22 is a flow diagram illustrating a process of a staple editing mode according to the present embodiment.

FIG. 22 is a flow diagram illustrating a process of a staple editing mode according to the present embodiment.

Referring to FIG. 22, it is first determined whether or not the preview image is being stopped (step S100). Specifically, when the editing mode is shifted to the staple editing mode in accordance with the notification from operation accepting unit 168, display control unit 166 determines whether or not the preview image is being stopped.

When it is determined in step S100 that the preview image is being stopped (YES in step S100), it is determined whether or not the scrolled preview image overlaps with the stopped preview image (step S102).

When it is determined in step S102 that the scrolled preview image overlaps with the stopped preview image (YES in step S102), a process of determining a staple position is performed (step S104). The process of determining a staple position will be described later.

Then, a process of accepting staple editing is performed (step S108). Specifically, display control unit 166 notifies operation accepting unit 168 that the preview images have overlapped with each other. Thus, operation accepting unit 168 accepts staple editing, and notifies image editing unit 164 of the accepted staple editing.

Then, preview image editing is performed (step S109). Specifically, image editing unit 164 instructs preview image generation unit 162 to display the preview image in the case of stapling performed based on the position of the accepted staple editing. Then, the process proceeds to step S110.

Furthermore, when it is determined in step S102 that the scrolled preview image does not overlap with the stopped preview image (NO in step S102), the process proceeds to step S110.

Then, it is determined whether it is detected or not that no operation instruction has been given (step S110). Specifically, it is determined whether or not the state where touching on the inner area of the preview image has been detected is shifted to the state where touching on the inner area of the preview image has not been detected. In other words, operation accepting unit 168 determines whether or not acceptance of staple editing has been ended.

In step S110, when it is detected that no operation instruction has been given (YES in step S110), the stopped state of the preview image is canceled (step S114). Specifically, operation accepting unit 168 notifies display control unit 166 that acceptance has been ended, and display control unit 166 causes the stopped preview image to resume scrolling from right to left. In other words, the preview image is again scrolled. Then, after the preview image disappears from the screen, the image editing process is performed and the printing process is performed, which is followed by staple editing in the post-processing device.

Then, the process ends (return).

On the other hand, when it is determined in step S100 that the preview image is not being stopped (NO in step S100), the preview image is stopped (step S112). Specifically, display control unit 166 determines whether or not the preview image is being stopped. If the preview image is not being stopped, display control unit 166 causes the preview image to be stopped.

Then, the process proceeds to "I", that is, returns to step S2 in FIG. 15.

Furthermore, in step S110, when it is not detected that no operation instruction has been given (NO in step S110), the process also proceeds to "I", that is, proceeds to the process for the next document image.

Figure 23:
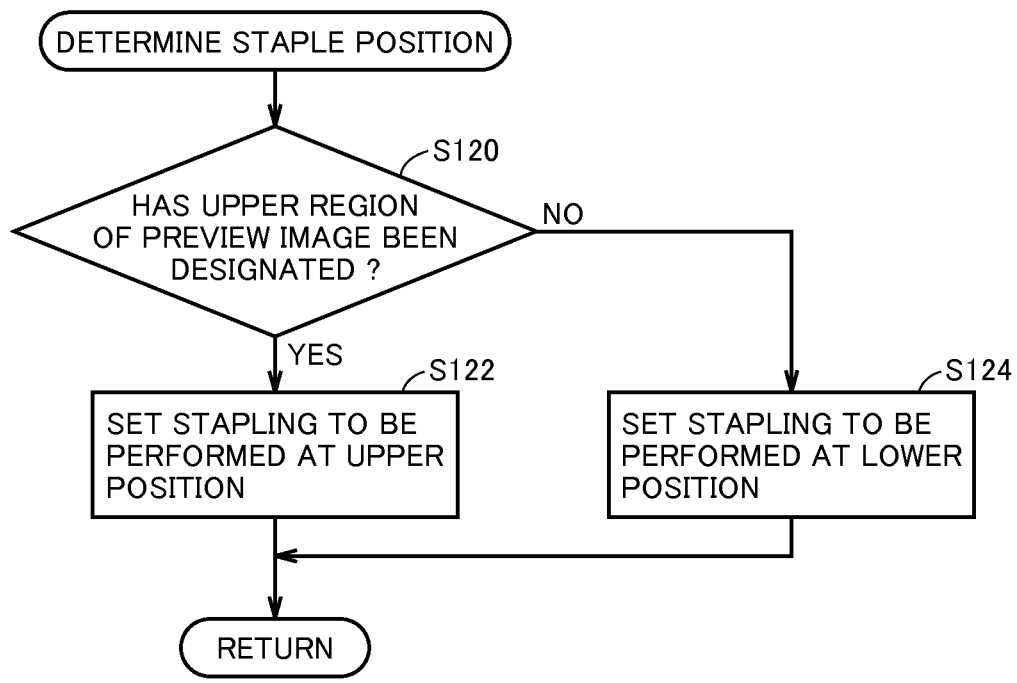
FIG. 23 is a flow diagram illustrating a process of determining a staple position.

FIG. 23 is a flow diagram illustrating a process of determining a staple position.

Referring to FIG. 23, it is first determined whether or not the upper region of the preview image has been designated (step S120). Specifically, when the editing mode is shifted to the staple editing mode, operation accepting unit 168 determines whether or not the upper region of the preview image has been designated.

When it is determined in step S120 that the upper region of the preview image has been designated (YES in step S120), stapling is set to be performed at an upper position of the image (step S122). Specifically, operation accepting unit 168 accepts the upper left position set for stapling and notifies image editing unit 164 about this position. Although this stapling position is not related to image editing in image editing unit 164, this position is output to the image forming unit, together with the information for specifying the upper left position for stapling that is notified from operation accepting unit 168, in order to allow execution of the stapling process in post-processing device FS in the subsequent stage. Then, the process ends (return).

On the other hand, when it is determined in step S120 that the upper region of the preview image has not been designated (NO in step S120), stapling is set to be performed at a lower position (step S124). Specifically, operation accepting unit 168 accepts the lower left position for stapling, and notifies image editing unit 164 of this position. Although this stapling position is not related to image editing in image editing unit 164, this position is output to the image forming unit, together with the information for specifying the lower left position for stapling that is notified from operation accepting unit 168, in order to allow execution of the stapling process in post-processing device FS in the subsequent stage. Then, the process ends (return).

The above-described stapling position corresponds to a position defined in advance by the stapling process in stapling process unit 71 of post-processing device FS.

The above-described process allows acceptance of staple editing that is post-processing editing as having been described with reference to FIG. 13.

As described above, in the present embodiment, image editing can be simply set in accordance with the region on the operation panel that has been touched.

Furthermore, post-processing editing can also be simply set by touching the preview image displayed on the operation panel.

[4. First Modification]

In the present first modification, an explanation will be given with regard to the case where acceptance of staple editing and acceptance of image editing for page combination into an N-in-1 layout are performed.

Figure 24:
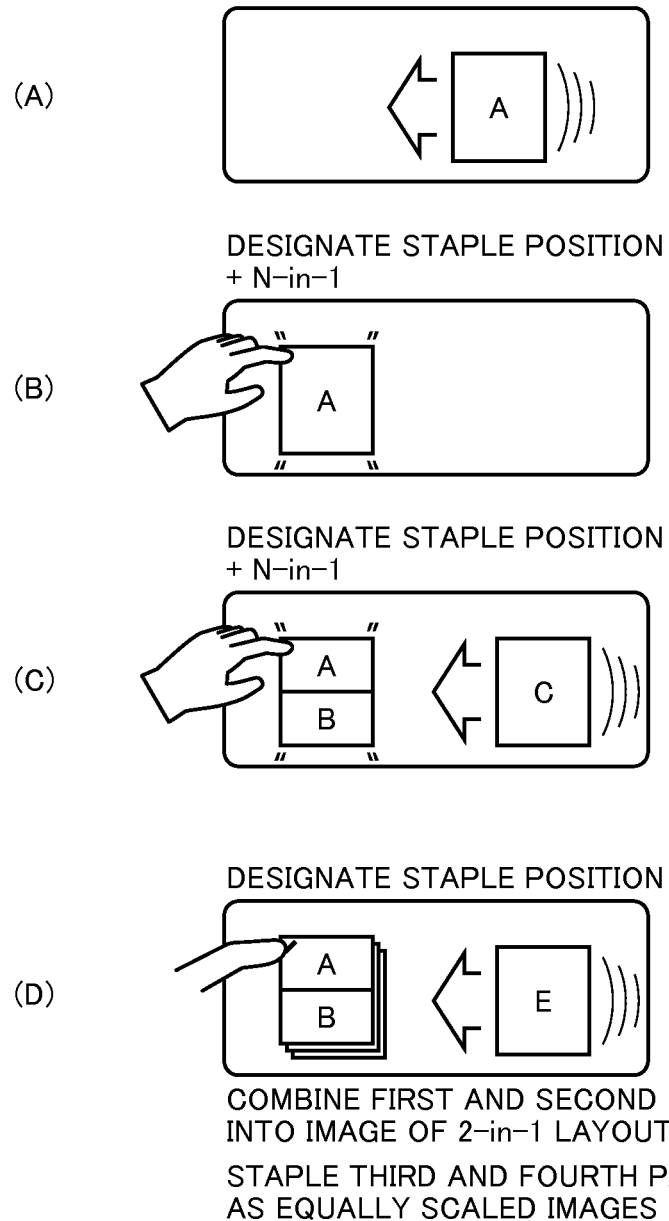
FIG. 24 is a diagram illustrating a manner of an operation on operation panel 13 according to a modification of the present embodiment.

FIG. 24 is a diagram illustrating a manner of an operation on operation panel 13 according to a modification of the present embodiment.

Referring to FIG. 24(A), the figure shows the case where scanner 1 reads the first page ("A") of the document. When scanner 1 reads the document, document image accepting unit 160 accepts image data on the first page of the document. Then, preview image generation unit 162 generates a preview image of the image data, and outputs the resulting image to display control unit 166. Then, display control unit 166 performs display control for this preview image (displaying in a scrolling manner). In the present example, the figure shows the case where a preview image is displayed on display unit 312 of operation panel 13 and scrolled from right to left.

Referring to FIG. 24(B), the figure shows the case where a user places his/her hand on an inner area of the preview image on operation panel 13. In other words, in this case, a staple editing is accepted as described above. Furthermore, the figure also shows the state where the user touches region SA besides the preview image. In this case, by the user placing his/her hand on region SA, the setting of image editing for page combination (N-in-1) is accepted as described above.

Referring to FIG. 24(C), the figure shows the case where the preview image on the first page ("A") of the document and the preview image on the second page ("B") overlap with each other, and a preview image obtained by image editing for page combination (2-in-1) is displayed. The preview image obtained by this image editing is also generated by preview image generation unit 162. Then, touching on region SA is canceled.

Referring to FIG. 24(D), the figure shows the case where the preview image on the third page ("C") of the document and the preview image on the fourth page ("D") of the document each overlap with the preview image obtained by image editing for page combination (2-in-1), and a staple editing process has been accepted. The figure shows the case where touching on region SA is canceled while the user keeps touching the inner area of the preview image. Therefore, since touching on region SA has been canceled, acceptance of the setting of image editing for page combination (N-in-1) is ended, as described above.

Then, when the user moves his/her hand away from the inner area of the preview image, the stopped preview image resumes scrolling from right to left. Then, after the preview image disappears from display unit 312, image editing unit 164 performs an image editing process for image data. In this case, the first and second pages of the document are subjected to a 2-in-1 image editing process. Furthermore, the image data on each of the third and fourth pages is, as an equally-scaled image, subjected to a staple editing process.

Figure 25:
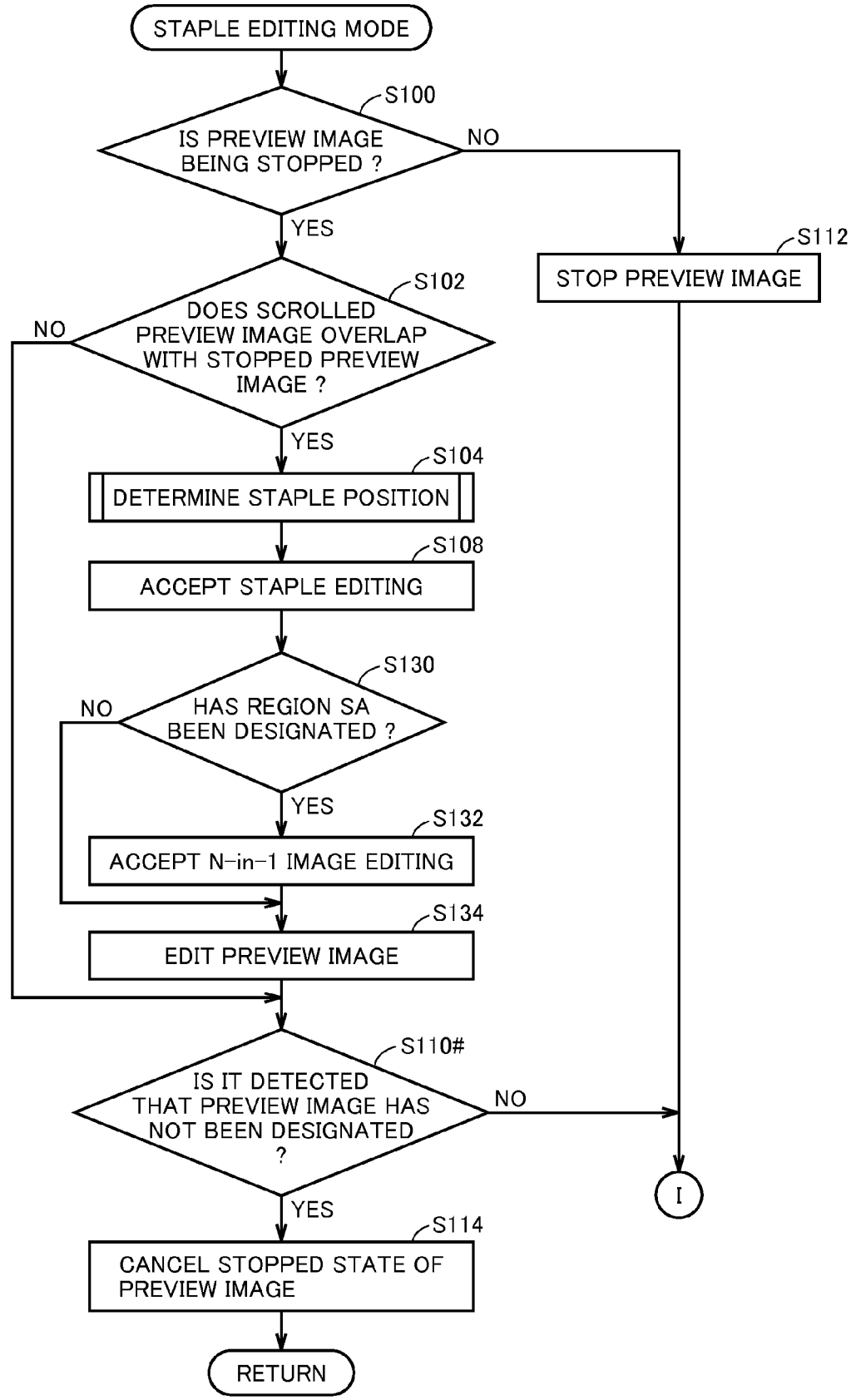
FIG. 25 is a flow diagram illustrating a process of a staple editing mode according to the modification of the present embodiment.

FIG. 25 is a flow diagram illustrating a process of a staple editing mode according to the modification of the present embodiment.

Referring to FIG. 25, it is first determined whether or not the preview image is being stopped (step S100). Specifically, when the editing mode is shifted to the staple editing mode in accordance with the notification from operation accepting unit 168, display control unit 166 determines whether or not the preview image is being stopped.

When it is determined in step S100 that the preview image is being stopped (YES in step S100), it is determined whether or not the scrolled preview image overlaps with the stopped preview image (step S102).

When it is determined in step S102 that the scrolled preview image overlaps with the stopped preview image (YES in step S102), a process of determining a staple position is performed (step S104). Since the process of determining a staple position is the same as that described with reference to FIG. 23, the detailed description thereof will not be repeated.

Then, a process of accepting staple editing is performed (step S108). Specifically, display control unit 166 notifies operation accepting unit 168 that the preview images have overlapped with each other. Thus, operation accepting unit 168 accepts staple editing, and notifies image editing unit 164 of the accepted staple editing. The process of accepting staple editing is performed based on the determination result of the process of determining a staple position.

Then, it is determined whether or not region SA has been designated (step S130). Specifically, it is determined whether or not touching on region SA has been detected. Specifically, operation accepting unit 168 determines whether or not image editing for page combination (N-in-1) has been accepted.

When it is determined in step S130 that region SA has been designated (YES in step S130), image editing for page combination (N-in-1) is accepted (step S132). Operation accepting unit 168 notifies display control unit 166 and image editing unit 164 that image editing for page combination has been accepted.

Then, the preview image is edited (step S134). Specifically, image editing unit 164 instructs preview image generation unit 162 to display, for example, a preview image in a 2-in-1 layout in the case where two preview images overlap with each other, and further, to display a preview image in the case of stapling performed based on the position of the accepted staple editing. Then, the process proceeds to step S110#.

Furthermore, when it is determined in step S102 that the scrolled preview image does not overlap with the stopped preview image (NO in step S102), the process proceeds to step S110#.

Then, it is detected whether a preview image has not been designated (step S110#). Specifically, it is determined whether or not the state where touching on the inner area of the preview image has been detected is shifted to the state where touching on the inner area of the preview image has not been detected. In other words, operation accepting unit 168 determines whether or not acceptance of staple editing has been ended.

When it is determined in step S110# that a preview image has not been designated (YES in step S110#), the stopped state of the preview image is canceled (step S114). Specifically, operation accepting unit 168 notifies display control unit 166 that acceptance has been ended, and display control unit 166 causes the stopped preview image to resume scrolling from right to left. Then, after the preview image disappears from the screen, the image editing process is performed and the printing process is performed, which is followed by staple editing in the post-processing device. Then, the process ends (return).

On the other hand, when it is determined in step S100 that the preview image is not being stopped (NO in step S100), the preview image is stopped (step S112). Specifically, it is determined whether or not the preview image is being stopping, and if not, the preview image is stopped.

Then, the process proceeds to "I", that is, returns to step S2 in FIG. 15.

Furthermore, in step S1104, it is not detected that no operation instruction has been given (NO in step S110#), the process also proceeds to "I", that is, proceeds to the process for the next document image.

The above-described process allows acceptance of staple editing that is post-processing editing described with reference to FIG. 24 as well as image editing for page combination.

As described above, in the modification of the present embodiment, it is possible to simply set post-processing editing by touching the preview image displayed on the operation panel, and also possible to achieve a combination with image editing for page combination in a simple manner by touching on a prescribed region.

[5. Second Modification]

In the present second modification, an explanation will be given with regard to the case where the process of accepting image editing for page combination into an N-in-1 layout is performed based on the number of fingers touching the screen.

Figure 26:
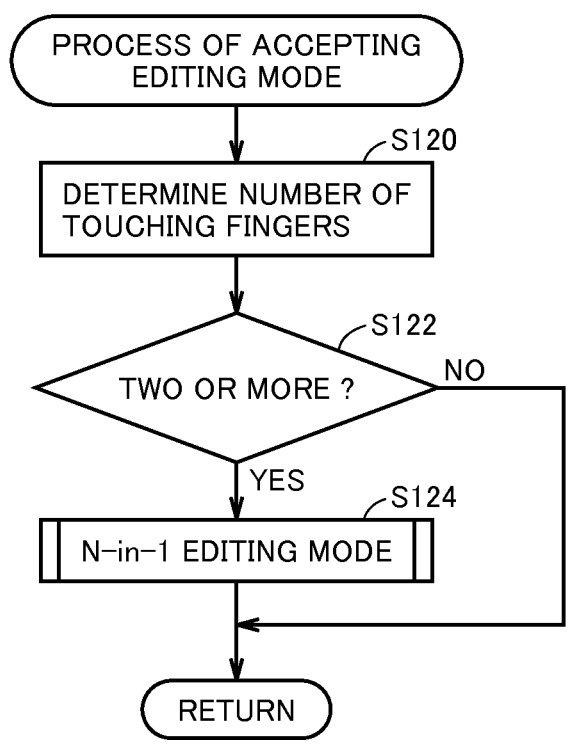
FIG. 26 is a flow diagram illustrating a process of accepting an editing mode according to the second modification of the present embodiment.

FIG. 26 is a flow diagram illustrating a process of accepting an editing mode according to the second modification of the present embodiment.

Referring to FIG. 26, the number of touching fingers is first determined (step S120). Specifically, operation accepting unit 168 determines how many touched points the touch panel of operation panel 13 is detected.

It is then determined whether the number of touching fingers is two or more (step S122). Specifically, it is determined whether touching at two or more positions on the touch panel of operation panel 13 is detected or not.

When it is determined in step S122 that the number of touching fingers is two or more (YES in step S122), the editing mode is shifted to an N-in-1 editing mode (step S124). Specifically, operation accepting unit 168 notifies display control unit 166 and image editing unit 164 that the editing mode has been shifted to the N-in-1 editing mode. The N-in-1 editing mode will be described later.

Then, the process ends (return).

When it is determined in step S122 that the number of touching fingers is not two or more (NO in step S122), the process ends (return).

Figure 27:
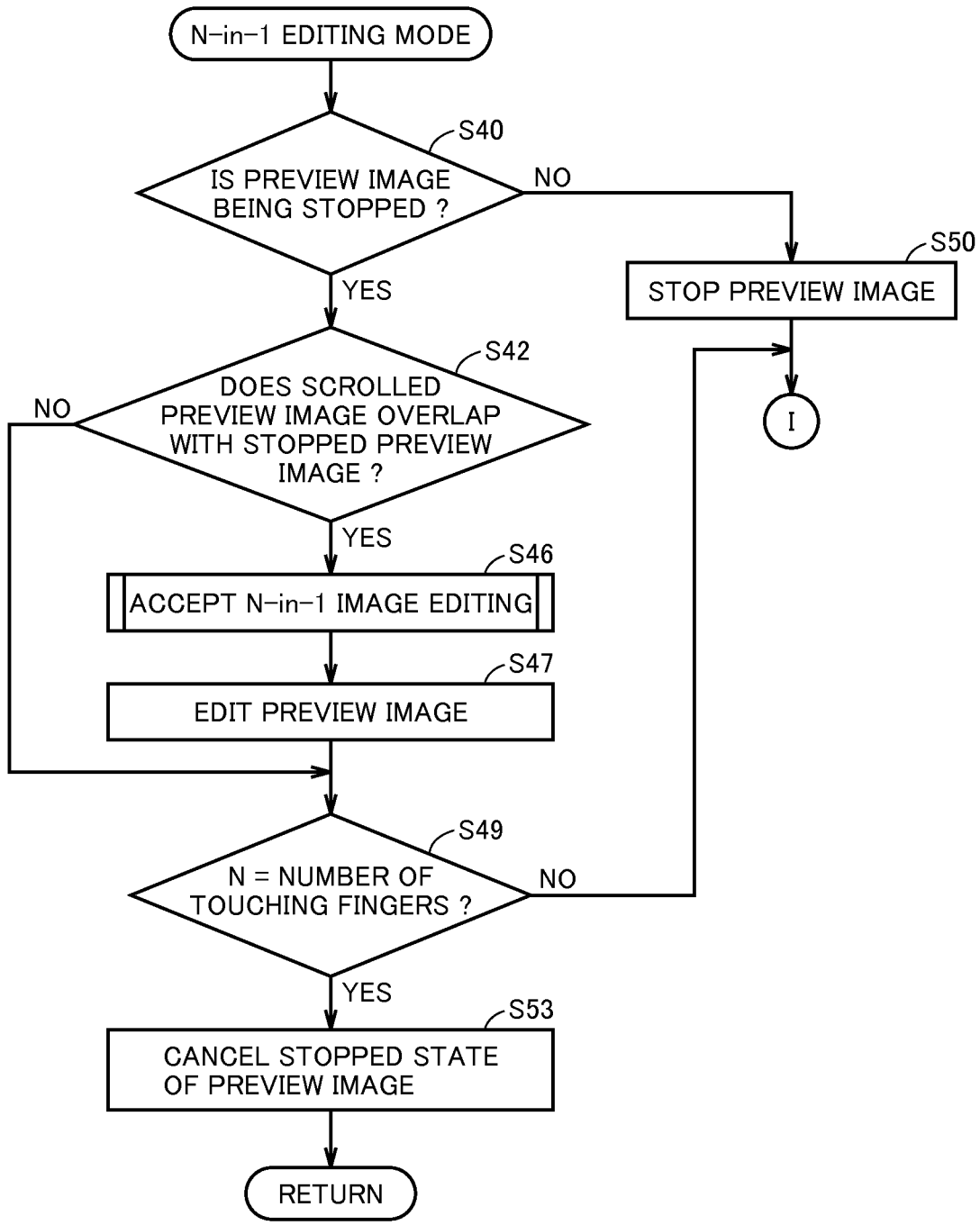
FIG. 27 is a flow diagram illustrating an N-in-1 editing mode according to the second modification of the present embodiment.

FIG. 27 is a flow diagram illustrating an N-in-1 editing mode according to the second modification of the present embodiment.

Referring to FIG. 27, it is first determined whether or not the preview image is being stopped (step S40). Specifically, when the editing mode is shifted to the N-in-1 editing mode in accordance with the notification from operation accepting unit 168, display control unit 166 determines whether or not the preview image is being stopped.

When it is determined in step S40 that the preview image is being stopped (YES in step S40), it is determined whether or not the scrolled preview image overlaps with the stopped preview image (step S42).

Then, the process of accepting image editing for page combination into an N-in-1 layout is performed (step S46). When two preview images overlap with each other, the image editing for page combination (2-in-1) is accepted. Specifically, display control unit 166 notifies operation accepting unit 168 that two preview images overlap with each other. Consequently, operation accepting unit 168 accepts image editing for page combination (2-in-1), and notifies image editing unit 164 of the accepted image editing.

Then, the preview images are edited (step S47). Specifically, image editing unit 164 gives an instruction to preview image generation unit 162. For example, when two preview images overlap with each other, a 2-in-1 preview image is displayed. Then, the process proceeds to step S49.

Furthermore, when it is determined in step S42 that the scrolled preview image does not overlap with the stopped preview image (NO in step S42), the process also proceeds to step S49.

Then, it is determined whether N is equal to the number of touching fingers (step S49). For example, when the number of touching fingers is two, it is determined whether or not the process of accepting 2-in-1 image editing has been performed. Operation accepting unit 168 determines the number of touching fingers, and determines whether or not the process of accepting image editing in accordance with the number of touching fingers has been performed.

When it is determined in step S49 that N is equal to the number of touching fingers (YES in step S49), the stopped state of the preview image is canceled (step S53). Specifically, when it is determined that the process of accepting image editing in accordance with the number of touching fingers has been performed, operation accepting unit 168 notifies display control unit 166 that acceptance has been ended, and display control unit 166 causes the stopped preview image to resume scrolling from right to left.

Then, the process ends (return). In other words, after the preview image subjected to 2-in-1 image editing is scrolled and disappears from operation panel 13, image editing unit 164 performs this image editing for printing on the recording paper sheet.

On the other hand, when it is determined in step S40 that the preview image is not being stopped (NO in step S40), the preview image is stopped (step S50). Specifically, display control unit 166 determines whether or not the preview image is being stopped. If the preview image is not being stopped, display control unit 166 causes the preview image to be stopped.

Then, the process proceeds to "I", that is, returns to step S2 in FIG. 15. In other words, the process proceeds to the process for the next document image.

Furthermore, when it is determined in step S49 that N is not equal to the number of touching fingers (NO in step S49), the process proceeds to "I", that is, returns to step S2 in FIG. 15.

Then, the process is repeated until N becomes equal to the number of touching fingers.

The above-described process allows setting of image editing for page combination into an N-in-1 layout in accordance with the number of fingers having touched the touch panel.

As described above, in the modification of the present embodiment, it becomes possible to simply set image editing for page combination into an N-in-1 layout in accordance with the number of fingers having touched the operation panel.

In addition, the image processing apparatus is not limited to those included in the image forming system, but may be a printer device, a facsimile machine or the like.

In addition, it is also possible to provide a program that causes a computer to function to execute the control that has been described in the above flow. The above-described program can be recorded on a non-transitory computer-readable recording medium such as a flexible disk attached to the computer, a CD-ROM (Compact Disk-Read Only Memory), a ROM (Read Only Memory), a RAM (Random Access Memory), and a memory card, and thus, provided as a program product. Alternatively, the program recorded on a non-transitory recording medium such as a hard disk incorporated in a computer can be provided.

In addition, the program may cause the process to be executed by invoking a required module in a prescribed arrangement at a prescribed timing from program modules provided as part of the operation system (OS) of the computer. In this case, the program itself does not include the above-described modules but cooperates with the OS to execute the process. The program not including the above-described modules may also be included in this program.

Furthermore, the program may be incorporated in a part of another program. Also in such a case, the program itself does not include any modules included in the above-described another program, but cooperates with another program to execute the process. The program included in another program as described above may also be included in the program according to the present invention.

The program product to be provided is installed in a program storage unit such as a hard disk for execution. It is to be noted that a program product includes a program itself and a non-transitory recording medium recording the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
a display;
a document image accepting unit for accepting input of an obtained document image;
a display control unit for causing a preview image of individual pages of the document image accepted by said document image accepting unit to be displayed on said display in a manner such that the preview image continuously moves in a prescribed direction from a first side of said display to a second side of said display and, unless movement of the preview image is stopped based on a user operation, disappears off said second side of said display;
an operation accepting unit for accepting (i) said user operation to selectively stop the movement of the preview image of any individual page of the document image, and (ii) an operation of image editing for document images, which are series of document images accepted by said document image accepting unit, including the document image corresponding to the preview image moving on said display; and
an editing unit for performing the image editing accepted by said operation accepting unit for said document images,
wherein when the operation accepting unit receives said user operation to selectively stop the movement of the preview image of a particular page of the document image, the operation accepting unit further enables acceptance of image editing of the stopped preview image of the particular page.

2. The image processing apparatus according to claim 1, wherein when a user performs an operation of stopping movement of the preview image on said display, said operation accepting unit is configured to:
   determine the operation as being for stopping movement of the preview image; and
   accept stop of movement of the preview image.

3. The image processing apparatus according to claim 2, wherein when detecting a user operation of stopping movement of the preview image in the prescribed direction on said display, said operation accepting unit is configured to determine the user operation as being for stopping movement of the preview image.

4. The image processing apparatus according to claim 2, wherein when detecting a user operation of pressing the preview image moving on said display, said operation accepting unit is configured to determine the user operation as being for stopping movement of the preview image.

5. The image processing apparatus according to claim 2, wherein
   said operation accepting unit further includes a position determination unit for determining a position of the preview image stopped on said display, and
   said editing unit is configured to change details of image editing based on a determination result of said position determination unit.

6. The image processing apparatus according to claim 5, wherein
   said image editing is image editing for page combination, and
   said editing unit is configured to switch a front surface and a back surface of a recording paper sheet to be subjected to image editing for page combination.

7. The image processing apparatus according to claim 2, wherein
   when said operation accepting unit accepts stop of movement of the preview image, said display control unit is configured to cause said display to display a corresponding preview image in a stopped state, and
   when a subsequent preview image moving in the prescribed direction overlaps with the stopped preview image, said operation accepting unit is configured to accept image editing for combining document images corresponding to overlapping preview images.

8. The image processing apparatus according to claim 7, wherein when said operation accepting unit accepts image editing for combining the document images corresponding to said overlapping preview images, said display control unit is configured to cause a preview image obtained by combining said document images to be displayed.

9. The image processing apparatus according to claim 7, wherein when the number of preview images in the document images subjected to page combination exceeds a prescribed number, said editing unit is configured to:
   perform image editing for combining the prescribed number of document images among the document images corresponding to said overlapping preview images for printing on a front surface of a recording paper sheet; and
   perform image editing for combining remaining document images among the document images corresponding to said overlapping preview images for printing on a back surface of said recording paper sheet.

10. The image processing apparatus according to claim 1, wherein when the user performs an operation of accepting post-processing editing for recording paper sheets corresponding to the document images and having images formed thereon, said operation accepting unit is configured to:
    determine the operation as being for accepting the post-processing editing for the recording paper sheets having images formed thereon; and
    accept the post-processing editing for the recording paper sheets having images formed thereon.

11. The image processing apparatus according to claim 7, wherein when the user performs an operation of cancelling stopped movement of the preview image displayed on said display, said operation accepting unit is configured to:
    determine the operation as being for cancelling stopped movement of the preview image;
    accept cancellation of stopped movement of the preview image; and
    end acceptance of image editing for combining the document images corresponding to said overlapping preview images.

12. The image processing apparatus according to claim 11, wherein in a case where the number of preview images in the document images subjected to page combination is an odd number when said operation accepting unit accepts cancellation of stopped movement of the preview image, said operation accepting unit is configured to end acceptance of image editing after accepting a document image corresponding to a next preview image or a blank image.

13. The image processing apparatus according to claim 1, wherein when said operation accepting unit accepts an operation of moving the preview image in a direction opposite to said prescribed direction of the preview image in a state where said operation accepting unit has accepted image editing for the preview image moving on said display, said operation accepting unit is configured to reset the accepted image editing.

14. The image processing apparatus according to claim 1, wherein when a user performs an operation of stopping input of the document image by said document image accepting unit, said operation accepting unit is configured to:
    determine the operation as being for stopping input of the document image; and
    accept stop of input of the document image.

15. The image processing apparatus according to claim 1, wherein
    said operation accepting unit further includes a finger detection unit for detecting a number of fingers that concurrently touch said display, and
    said operation accepting unit is configured to:
    determine that image processing for combining said document images in accordance with the number of fingers detected by said finger detection unit has been accepted; and
    accept image processing for combining said document images.

16. The image processing apparatus according to claim 1, wherein the document image accepting unit continues to accept input of the obtained images of pages subsequent to the prescribed page when the operation accepting unit enables acceptance of image editing of the stopped preview image of the particular page.

17. The image processing apparatus according to claim 16, wherein said operation accepting unit, until said preview image moving on said display disappears off said second side of said display, accepts the operation to edit said document image corresponding to said preview image.

18. An image processing apparatus comprising:
a display;
a document image accepting unit for accepting input of an obtained document image;
a display control unit for causing a preview image of individual pages of the document image accepting by said document image accepting unit to be displayed on said display in a manner such that the preview image continuously moves in a prescribed direction from a first side of said display to a second side of said display and, unless movement of the preview image is stopped based on a user operation, disappears off said second side of said display;
an operation accepting unit for accepting (i) said user operation to selectively stop the movement of the preview image of any individual page of the document image, and (ii) an operation of post-processing editing for document images, which are series of document images accepted by said document image accepting unit, including the document image corresponding to the preview image moving on said display; and
an output unit for outputting, to a post-processing device, post-processing editing so as to be performed that is accepted by said operation accepting unit for recording paper sheets corresponding to said document images and having images formed thereon,
wherein when the operation accepting unit receives said user operation to selectively stop the movement of the preview image of a particular page of the document image, the operation accepting unit further enables acceptance of post-processing editing of the stopped preview image of the particular page.

19. A method of controlling an image processing apparatus including a display, said method comprising:
accepting input of an obtained document image;
causing a preview image of individual pages of the accepted document image to be displayed on said display in a manner such that the preview image continuously moves in a prescribed direction from a first side of said display to a second side of said display and, unless movement of the preview image is stopped based on a user operation, disappears off said second side of said;
accepting (i) said user operation to selectively stop the movement of the preview image of any individual page of the document image, and (ii) an operation of image editing for document images, which are series of document images accepted, including the document image corresponding to the preview image moving on said display; and
performing the image editing accepted for said document images,
wherein when said user operation is received to selectively stop the movement of the preview image of a particular page of the document image, further accepting image editing of the stopped preview image of the particular page.

20. A method of controlling an image processing apparatus including a display, said method comprising:
accepting input of an obtained document image;
causing a preview image of individual pages of the accepted document image to be displayed on said display in a manner such that the preview image continuously moves in a prescribed direction from a first side of said display to a second side of said display and, unless movement of the preview image is stopped based on a user operation, disappears off said second side of said display;
accepting (i) said user operation to selectively stop the movement of the preview image of any individual page of the document image, and (ii) an operation of post-processing editing for document images, which are series of document images accepted, including the document image corresponding to the preview image moving on said display; and
outputting, to a post-processing device, post-processing editing so as to be performed that is accepted for recording paper sheets corresponding to said document images and having images formed thereon,
wherein when user operation is received to selectively stop the movement of the preview image of a particular page of the document image, further accepting post-processing editing of the stopped preview image of the particular page.

21. A non-transitory recording medium storing a control program executed by a computer of an image processing apparatus including a display, said control program causing said computer to perform a process including:
accepting input of an obtained document image;
causing a preview image of individual pages of the accepted document image to be displayed on said display in a manner such that the preview image continuously moves in a prescribed direction from a first side of said display to a second side of said display and, unless movement of the preview image is stopped based on a user operation, disappears off said second side of said display;
accepting (i) said user operation to selectively stop the movement of the preview image of any individual page of the document image, and (ii) an operation of image editing for document images, which are series of document images accepted, including the document image corresponding to the preview image moving on said display; and
performing the image editing accepted for said document images,
wherein when said user operation is received to selectively stop the movement of the preview image of a particular page of the document image, further accepting image editing of the stopped preview image of the particular page.

22. A non-transitory recording medium storing a control program executed by a computer of an image processing apparatus including a display, said control program causing said computer to perform a process including:
accepting input of an obtained document image;
causing a preview image of individual pages of the accepted document image to be displayed on said display in a manner such that the preview image continuously moves in a prescribed direction from a first side of said display to a second side of said display and, unless movement of the preview image is stopped based on a user operation, disappears off said second side of said display;
accepting (i) said user operation to selectively stop the movement of the preview image of any individual page of the document image, and (ii) an operation of post-processing editing for document images, which are series of document images accepted, including the document image corresponding to the preview image moving on said display; and
outputting, to a post-processing device, post-processing editing so as to be performed that is accepted for recording paper sheets corresponding to said document images and having images formed thereon, wherein when said user operation is received to selectively stop the movement of the preview image of a particular page of the document image, further accepting post-processing editing of the stopped preview image of the particular page.

* * * * *